US007660295B2

(12) United States Patent
Allan et al.

(10) Patent No.: US 7,660,295 B2
(45) Date of Patent: *Feb. 9, 2010

(54) TELEPHONY AND DATA NETWORK SERVICES AT A TELEPHONE

(75) Inventors: William Allan, Ottawa (CA); Robert S. Morley, Ottawa (CA); Kris W. Kramer, Kanata (CA); Larry John David, Constance Bay (CA); Kenneth M. Orford, Nepean (CA); Peter P. Blatherwick, Ottawa (CA); Robert M. Star, Kanata (CA); Kenneth J. Liang, Kanata (CA); Dariusz Otreba, Nepean (CA); Paul Provencal, Hull (CA); Robert Joly, Nepean (CA)

(73) Assignee: Nortel Networks Limited, St. Laurent, Quebec (CA)

( * ) Notice: Subject to any disclaimer, the term of this patent is extended or adjusted under 35 U.S.C. 154(b) by 524 days.

This patent is subject to a terminal disclaimer.

(21) Appl. No.: 11/300,997

(22) Filed: Dec. 15, 2005

(65) Prior Publication Data

US 2007/0297394 A1 Dec. 27, 2007

Related U.S. Application Data

(63) Continuation of application No. 09/564,561, filed on May 4, 2000, now abandoned, which is a continuation-in-part of application No. 09/307,356, filed on May 7, 1999, now Pat. No. 7,068,641.

(30) Foreign Application Priority Data

May 5, 1999 (CA) .................................... 2271180
Jun. 7, 1999 (CA) .................................... 2273657

(51) Int. Cl.
*H04L 12/56* (2006.01)
*H04L 12/66* (2006.01)
*H04M 1/64* (2006.01)
*H04M 11/00* (2006.01)
*G06F 15/16* (2006.01)

(52) U.S. Cl. ................ 370/352; 370/389; 370/401; 379/88.17; 379/93.07; 379/93.14; 379/221.08; 709/203; 709/227

(58) Field of Classification Search .................. 370/352, 370/389, 401; 379/88.17, 93.07, 93.14, 221.08; 709/203, 227
See application file for complete search history.

(56) References Cited

U.S. PATENT DOCUMENTS 4,893,310 A 1/1990 Robertson et al.

(Continued)

FOREIGN PATENT DOCUMENTS

| EP | 0 781 016 | 6/1997 |
|---|---|---|
| WO | WO 97/31492 | 8/1997 |
| WO | WO 98/21872 | 5/1998 |

OTHER PUBLICATIONS

Andrew Catchpole, "Voice-Data Convergence and the Corporate Voice-Over-IP Trial", Computer Telephony Integration, British Telecommunications Engineering, vol. 17, Jan. 1999, pp. 218-224.

(Continued)

*Primary Examiner*—Alpus H Hsu

(57) ABSTRACT

A packetised data network includes IP telephones (ITs) and a network intelligence (NI). All of the keys of each IT are "soft" keys (i.e., they have no fixed function). The NI associates a configuration data structure with the IT which correlates the keys with functions, and, based on this, may control the display of the IT to indicate the current function of certain of the soft keys. Some of the functions are requests for data services at the telephone (e.g., video or programmed audio over the internet). When a user requests such a service with a key press, the NI sets up the service between the data source and the telephone. This may require associating a new configuration data structure with the keys of the IT. The IT user may activate multiple data services through the NI.

18 Claims, 7 Drawing Sheets

U.S. PATENT DOCUMENTS

| | | | |
|---|---|---|---|
| 5,485,370 A | 1/1996 | Moss et al. | |
| 5,541,917 A | 7/1996 | Farris | |
| 5,583,920 A | 12/1996 | Wheeler, Jr. | |
| 5,610,910 A | 3/1997 | Focsaneanu et al. | |
| 5,625,678 A | 4/1997 | Blomfield-Brown | |
| 5,771,279 A | 6/1998 | Cheston, III et al. | |
| 5,790,671 A | 8/1998 | Cooper | |
| 5,828,666 A | 10/1998 | Focsaneanu et al. | |
| 5,881,103 A | 3/1999 | Wong et al. | |
| 5,915,008 A * | 6/1999 | Dulman | 379/221.08 |
| 5,991,292 A | 11/1999 | Focsaneanu et al. | |
| 6,044,264 A | 3/2000 | Huotari et al. | |
| 6,131,095 A | 10/2000 | Low et al. | |
| 6,161,008 A | 12/2000 | Lee et al. | |
| 6,161,134 A | 12/2000 | Wang et al. | |
| 6,185,616 B1 * | 2/2001 | Namma et al. | 709/227 |
| 6,229,810 B1 | 5/2001 | Gerszberg et al. | |
| 6,282,281 B1 | 8/2001 | Low | |
| 6,381,329 B1 * | 4/2002 | Uppaluru et al. | 379/266.04 |
| 6,385,646 B1 | 5/2002 | Brown et al. | |
| 6,393,481 B1 | 5/2002 | Deo et al. | |
| 6,445,695 B1 | 9/2002 | Christie, IV | |
| 6,446,127 B1 | 9/2002 | Schuster et al. | |
| 6,466,662 B1 * | 10/2002 | Klaghofer et al. | 379/212.01 |
| 6,564,261 B1 | 5/2003 | Gudjonsson et al. | |
| 6,584,093 B1 | 6/2003 | Salama et al. | |
| 6,584,490 B1 | 6/2003 | Schuster et al. | |
| 6,587,684 B1 * | 7/2003 | Hsu et al. | 455/419 |
| 6,711,157 B1 | 3/2004 | Tang et al. | |
| 6,831,915 B1 | 12/2004 | Beyschlag et al. | |
| 6,937,597 B1 * | 8/2005 | Rosenberg et al. | 370/356 |

OTHER PUBLICATIONS

Richard A. DeMillo, "The Internet as a Telephone Network", Educom Review, Jan./Feb. 1998, pp. 12-16.

Allan Hansson et al., "Phone Doubler—A Step Towards Integrated Internet and Telephone Communities", Encsson Review, No. 4, 1997, pp. 142-151.

Polle T. Zellweger et al., "An Overview of the Etherphone System and its Applications", 1988 IEEE, pp. 160-168.

Richard Platt, ISP Centrex, "A White Paper Discussing ISP Centrex Value and Functionality", Feb. 20, 1998, Version 2.0.

Selsuis Systems Inc., A Fundamental Shift in Telephony Networks, Mar. 1, 1998.

* cited by examiner

TELEPHONY AND DATA NETWORK SERVICES AT A TELEPHONE

CROSS-REFERENCE TO RELATED APPLICATION

This application is a continuation of prior application Ser. No. 09/564,561 filed on May 4, 2000 now abandoned, which is a continuation-in-part of application Ser. No. 09/307,356 filed May 7, 1999 now U.S. Pat. No. 7,068,641 and entitled TELEPHONY AND DATA NETWORK SERVICES AT A TELEPHONE, and which is incorporated herein by reference.

FIELD OF THE INVENTION

This invention relates to the provision of telephony and corporate and public data network services at a telephone. The system has application to internet protocol (IP) based telephony.

BACKGROUND OF THE INVENTION

Traditionally, a private branch exchange (PBX) has been used to provide telephone services to a network of local telephones. The PBX may exist in parallel with a local area network (LAN) which provides data services to a network of local computers. It has been contemplated to provision a LAN not only with computers but also with special telephones so that the network can provide telephony services in addition to data services thereby avoiding the need for parallel networks. In a known system, IP telephones connect to the LAN backbone as does a call manager (which is a server configured with call management software) and a gateway to the public switched telephone network (PSTN). The IP telephones include a vocoder so that audio signals may be converted between analog and IP packets. The call manager has a configuration file for each telephone on the LAN assigning call functions to certain of the buttons on the phone, which call functions will be handled by the call manager. Other call functions (e.g., "mute") are handled by the telephone itself. When the call manager receives keypad digits from a calling phone on the LAN indicative of a called station, it sets up a call by instructing the calling phone to set up a Real-Time Protocol (RTP) audio stream to either the called telephone, if the called telephone is on the LAN, or to the gateway, if the called telephone is on the PSTN. Once the call is set up, the call manager is out of the loop unless the call manager receives a key press indication indicative of a call control function handled by the call manager, such as a call transfer, call hold, call forward, call park, multiple line appearance, or disconnect.

SUMMARY OF THE INVENTION

According to one aspect, the present invention provides an IP telephone (IT) where preferably all of the keys are "soft" keys (i.e., they have no fixed function). The network intelligence (NI) associates a configuration data structure with the IT which correlates the keys with functions, and, based on this, may control the display of the IT to indicate the current function of certain of the soft keys. Some of the functions may be requests for data services at the telephone (e.g., video or programmed audio over the internet). When a user requests such a service with a key press, the NI sets up the service between the data source and the telephone. This may require associating a new configuration data structure with the keys of the IT. The IT user may activate multiple data services through the NI. If none of the keys of the IT has a fixed function, the NI can more easily arrange for the provision of the services without conflicting with any telephony calls at the telephone.

According to the present invention, there is provided a network intelligence for a data network, comprising: a call service provider for, when connected to a plurality of data network telephones, facilitating provision of telephony services for said plurality of telephones; and at least one service proxy for, when connected to at least one data source, setting up at least one data service between said at least one data source and said plurality of telephones.

According to another aspect of the invention, there is provided a telephony system, comprising: a plurality of telephones connected to a data network; a network intelligence connected to said network for facilitating provision of telephony services to said plurality of telephones and, where said network is also connected to a data source, for providing a data service between said plurality of telephones and said data source.

According to a further aspect of the invention, there is provided a method of remotely managing a telephone over a data network, comprising: receiving indications from said telephone over said data network; based on said indications, activating a plurality of data services on said data network; determining an active one of said plurality of data services and sending control messages to said telephone over said data network so that said telephone can provide said active data services; and based on further indications received from said telephone over said data network, sending control messages to said telephone to establish a voice call.

According to yet a further aspect of the invention, there is provided a method of coordinating a telephone and personal computer (PC) at a workstation which are both connected to a data network, comprising: setting up a data service at said PC from a data source; and setting up a co-ordinated data service between said telephone and said data source over said data network.

According to another aspect of the invention, there is provided a method of managing a telephone connected to a data network, comprising: based on user input messages from said telephone, establishing a voice call; before or after establishment of said voice call, establishing at least one non-telephony data service between said telephone and at least one data source such that said at least one non-telephone data service remains established during pendency of said voice call, at least where said at least one data service does not conflict with said voice call.

BRIEF DESCRIPTION OF THE DRAWINGS

In the figures which illustrate example embodiments of the invention.

DETAILED DESCRIPTION OF THE PREFERRED EMBODIMENTS

Figure 1:
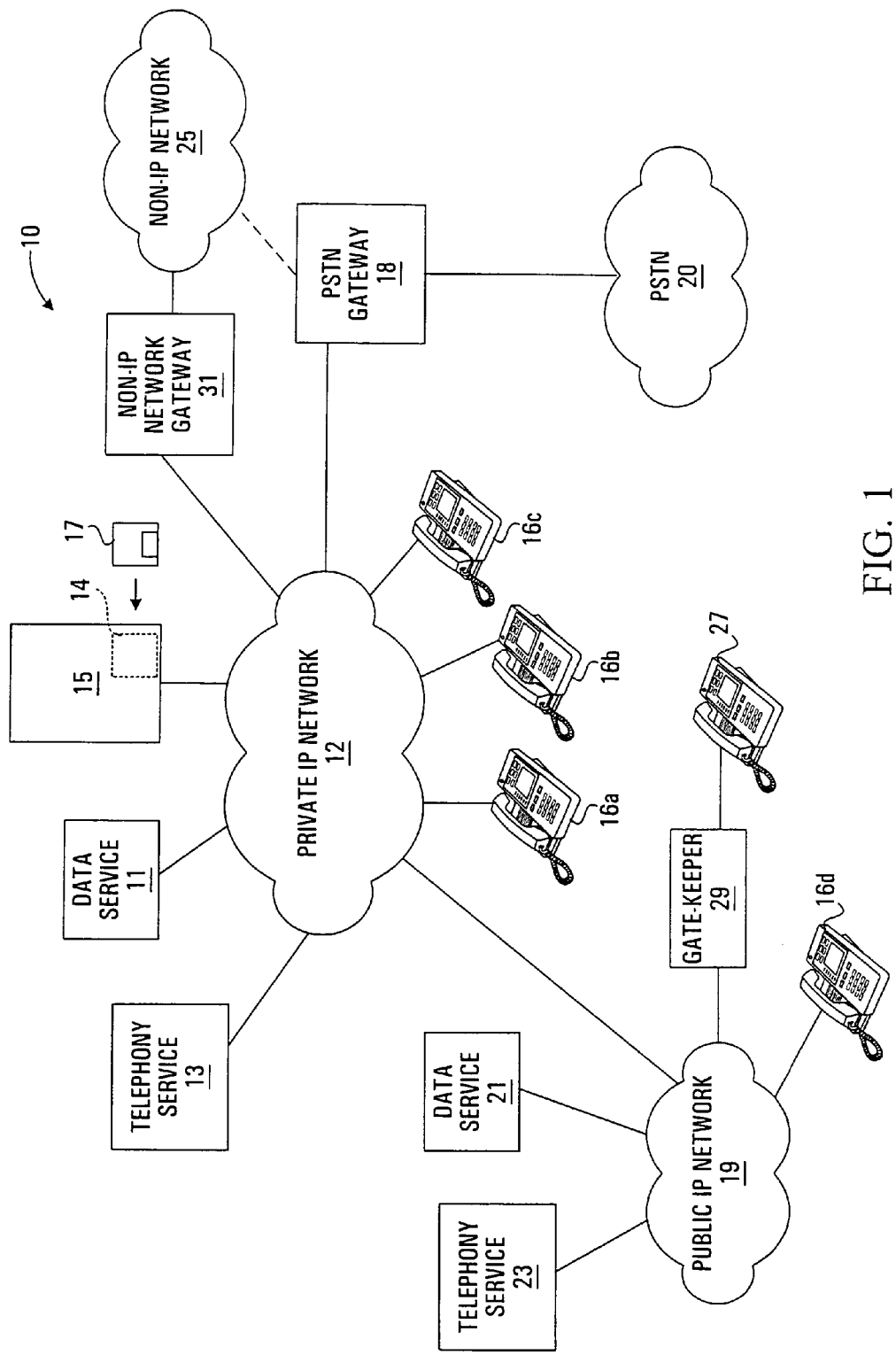
FIG. 1 is a schematic diagram of a telephony system made in accordance with this invention.

Referring to FIG. 1, a telephony system 10 comprises a private IP network 12 connected to an NI 14, ITs 16a, 16b, 16c, a data service 11, a telephone service 13, a public switched telephone network (PSTN) gateway 18, and a public IP network 19. PSTN gateway 18 connects to a PSTN 20. The public IP network 19 may include an IT 16d, a data service 21 and a telephony service 23 and an internet protocol telephone 27 connected to the public IP network 19 through a gateway 29. The NI 14 may also connect to a non-IP network 25 through a gateway 31. The private UP network could be in the nature of a local area network (LAN), such as an ethernet, or a wide area network (WAN). The public IP network could be an internet. The non-IP network could be an integrated services digital network (ISDN), a wireless network, or a proprietary network.

The NI is software which executes on a processing entity 15 comprising a central processing unit, memory and a network interface. The processing entity may be a personal computer (PC), network server, or other general computer resource which may or may not be dedicated to running the NI. The processing entity may be loaded with the NI from any computer readable medium, such as disk 17, a tape, or a memory chip. Also, the NI may be down loaded from a remote source on the private or public UP network. Optionally, the processing entity 15 may be a dedicated processor, memory, and network interface into which the NI is embedded.

The IT reacts to events generated by a user (e.g., key presses, hook switch transitions) and reports these to the NI by sending IP messages over the private UP network in accordance with an elemental control protocol described hereinafter. The UP messages are transported using the IP protocol suite (specifically, messages are transported over a reliable user datagram protocol—UDP—layer). The NI, which implements the functional model of the IT, reacts to these events and controls the function of the terminal (user interface, visual/audio feedback, audio hardware control etc.) by sending elemental control messages to the IT. Using this approach, the IT software design can be static but the functional model of the IT may change, as new features and services become available, by simply changing the functional IT emulator software in the NI. This removes design complexity in the IT. Because the IT does not execute industry evolving functional protocol stacks locally (e.g. H.323), the IT does not become obsolete as new versions of the protocols evolve. All evolving protocol dependant software is maintained in the NI where software updates are handled easily. In this model, the NI acts as a proxy agent for the IT by converting messages received from the IT to appropriate standard protocol.

All of the keys of the IT are "soft keys", that is, the keys can be assigned a function within the NI. This facilitates the provision of, along with telephony services, services not usually associated with a telephony device, such as access to live or archival audio programming available over the IP network (e.g., REAL AUDIO™), stock quotation updates, and web browsing.

Figure 2:
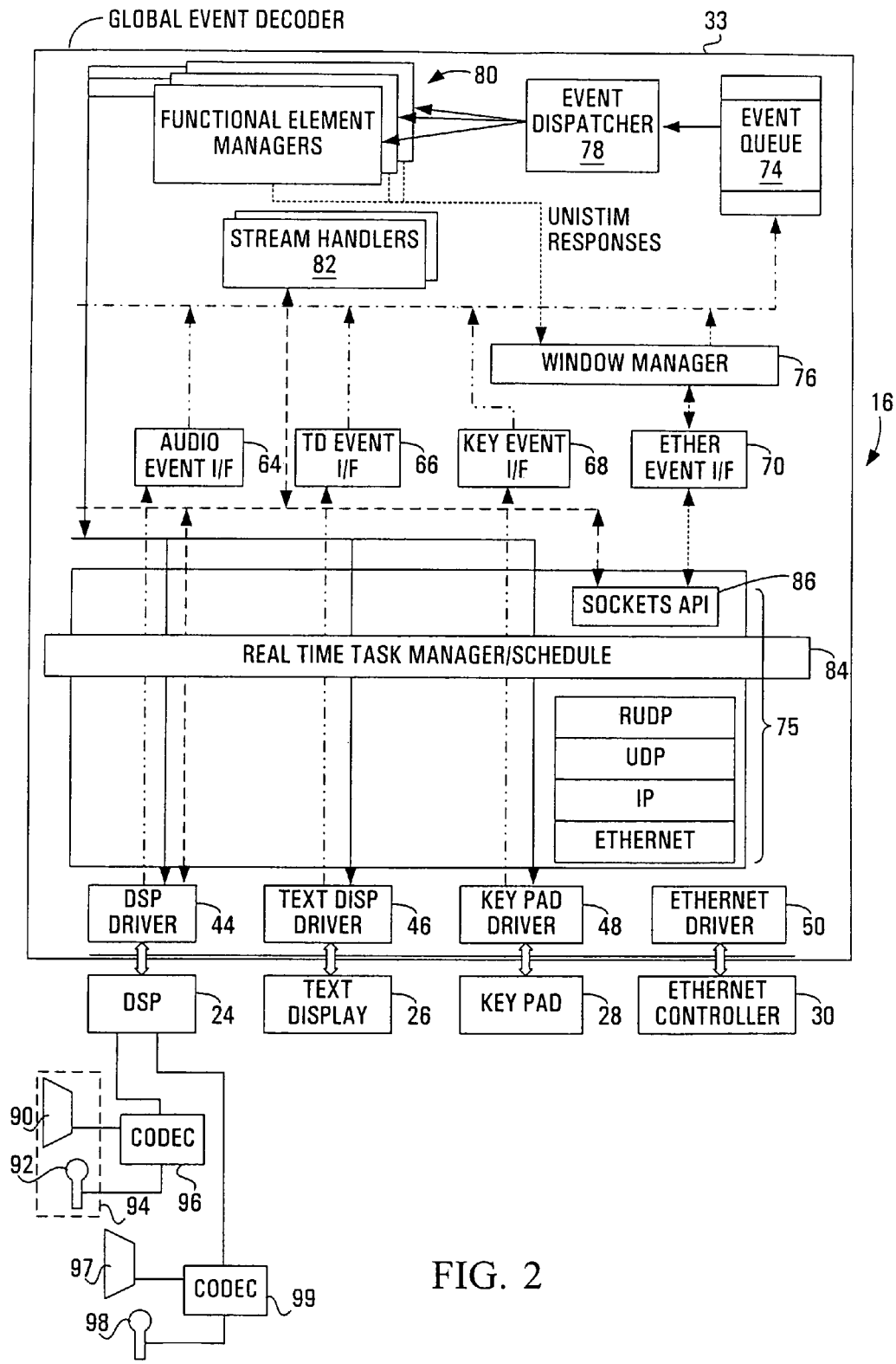
FIG. 2 is a functional block diagram of the software architecture for an IT of FIG. 1.

The architecture for each IT is illustrated in FIG. 2. Turning to FIG. 2, the hardware of an IT 16 comprises a digital signal processor (DSP) 24, a text display 26, a set of keys (and a hookswitch) 28, and an ethernet controller 30 (which includes a port to the private IP network). These devices interface with a processor 33 which maintains, for each of the devices, a software driver 44, 46, 48, and 50, respectively. An event originating at any of these devices passes to a software event interface 64, 66, 68, and 70 for the respective devices. The processor 33 may also establish a connection between the ethernet controller 30 and any of the other devices through an IP protocol stack 75. An event queue 74 receives inputs from the event interfaces and from a window manager 76 and outputs to an event dispatcher 78. The event dispatcher 78 outputs to functional element managers 80 and any associated stream handlers 82 created by the functional element managers. The stream handlers of the functional element managers are interconnected with the IP protocol stack 75 and they, through their functional element managers 80, output to the device drivers. The functional element managers also output to the window manager 76. Communication with the device drivers is through a real time operating system (RTOS) 84. The RTOS maintains the IP protocol stack 75 as well as software sockets 86 in the stack.

The DSP 24 is connected to speaker 90 and microphone 92 of handset 94 through a codec 96 (which is an analog-to-digital (A/D) and digital-to-analog (D/A) converter) and to handsfree speaker 97 and handsfree microphone 98 through codec 99.

Each functional element manager 80 is designed to control a particular hardware device, group of hardware devices, or a specific set of book keeping tasks. These managers interact directly with the NI via elemental control messages to provide a control entry point to the IT. The managers provide two major capabilities:

1. They are responsible for parsing incoming elemental command messages from the NI and translating the high level messages into low level commands directed to specific hardware devices within the IT. The managers 80 control each of the hardware devices, other than the ethernet controller 30, via its corresponding device driver.
2. They are responsible for monitoring internally generated events (keypad presses, software timeouts) and reformatting these into elemental control messages, which are sent to the NI.

The specific functional element managers are as follows: a broadcast manager; network manager; basic manager; key/indicator manager; audio manager; and display manager. The broadcast manager is used to broadcast commands to all of the hardware devices of the IT. The network manager provides terminal initialisation, network maintenance and encryption. The basic manager provides an interface to query the status and operating parameters of the IT (e.g., the NI may query a hardware identifier). The key/indicator manager is responsible for managing all of the keys, indicators and associated commands within the IT. Key press events, hook switch events, key/indicator status, icon states and LED cadencing are all governed by this manager. The audio manager is responsible for all aspects of the audio including path setup, audio stream setup, and path maintenance. The display manager controls the display of the IT.

The elemental control messages sent by the NI to the functional element managers and from the functional element managers to the NI follow IP and are, therefore, packetised messages. The protocol for the messages contemplated for each of the functional element managers 80 is set out in Appendix A.

The managers sit on top of the RTOS 84, which provides the hardware abstraction layer. In particular, the RTOS provides priority based scheduling of system tasks; consistent application programming interfaces (APIs) for low level driver abstraction; inter-task communications primitives and data memory management control; and a tightly integrated transport control protocol/internet protocol (TCP/IP) stack, through which the ethernet driver 50 is controlled. While not preferred, optionally, the RTOS may be replaced by a simple task manager. In such case, the functional element managers would require greater sophistication in order to handle the different APIs of the various device drivers.

Below the RTOS sits the physical hardware drivers. If a piece of hardware changes, only the driver for that hardware and the respective event interface will need to change. Hardware can therefore be added or removed without impacting the rest of the software. The drivers are generally designed to be aware of two types of data—signalling events and media streams—and provide a separate API for each.

While all drivers except the ethernet driver 50 are controlled by the functional element managers, the ethernet driver 50 is controlled by the RTOS through the IP protocol stack 75. All functional element manager communication with the ethernet driver 50 is therefore done indirectly by opening a socket 86 at one of the IP protocol layers 75 (e.g., a simple IP socket or a datagram-based UDP socket). Data from the functional element managers thus passes through an opened socket, down the IP protocol stack to the ethernet driver; conversely, the ethernet driver 50 passes received data to the IP stack, up to the socket API layer such that the element manager that had opened the socket will receive the data.

There is only one event queue 74 and all internal and external events (elemental control messages) are placed in that event queue. This ensures that all events acted upon by the IT will be processed based on order of arrival. Media streams, on the other hand, bypass the event queue, as described hereinafter.

The window manager 76 intercepts all incoming elemental control messages. The purpose of the window manager is to allow the IT to be responsive to commands from more than one NI (and, as described hereinafter, in some instances to facilitate start-up). However, at any point in time, only one NI's commands are directed to the hardware resources. While a particular NI is controlling the IT resources, it has complete control of the IT (no resource sharing with other NIs). To gain access to a different NI, the user must activate that NI via the window manager. This forces the IT to switch the hardware resources to the newly activated NI providing a window to the IT.

As the user switches from NI 'A' to NI 'B', NI 'A' no longer has control of the IT resources and must be informed of this condition. The IT uses the "suspend Connection with Server" command from the elemental control message protocol for this purpose. Similarly, the IT uses "Resume Connection with Server" message to 'start' or 'resume' the session with NI 'B'. NI 'B' uses this message as a signal to refresh the display and other IT hardware components as required.

As stated above, only one NI has access to the IT resources at a given time. There may be situations, however, when it is necessary for one of the "suspended" NIs to inform the IT of a special event. An example would be the reception of an incoming call on a suspended server. To allow the disconnected NI to inform the IT, and hence the user, of an important event, thereby allowing the user to decide how to handle the event, the elemental control message protocol provides the "Server Alarm" message. The "Server Alarm" message allows a disconnected NI to signal an event and a text string to the IT. The IT decodes the event, and informs the user of the pending event. The user may then decide to accept or reject the event. Upon reception of the event, the IT would suspend the current NI and switch to the new NI via "Suspend Connection with Server" and "Resume Connection with Server" messages as described above. If the user elects to reject the event, then the terminal sends a "Resume Connection with Server" message to the current NI to inform it that it needs to refresh the display.

One final capability of the elemental control message protocol, related to the handling of multiple NIs, is the ability to reserve a 'block' of UDP port numbers. In the IP domain, the media streams associated with voice and or video are typically transported using UDP. The setup of the media streaming with the far end device is performed by the NI on the IT's behalf. However, the IP stack is operated locally by the IT. As different NIs are added to the IT's list of supported NIs, there is no guarantee that a given UDP port number is available for a call setup session. To allow a given NI to guarantee that the negotiated UDP port is available on the IT, the NI must have previously reserved the UDP port via the "Reserve UDP Port Block" message. The IT responds with the "Reserve UDP Port Block Report" message. Once a successful message exchange has taken place, the IT will guarantee that the reserved port numbers are not given out to other NIs.

Figure 3:
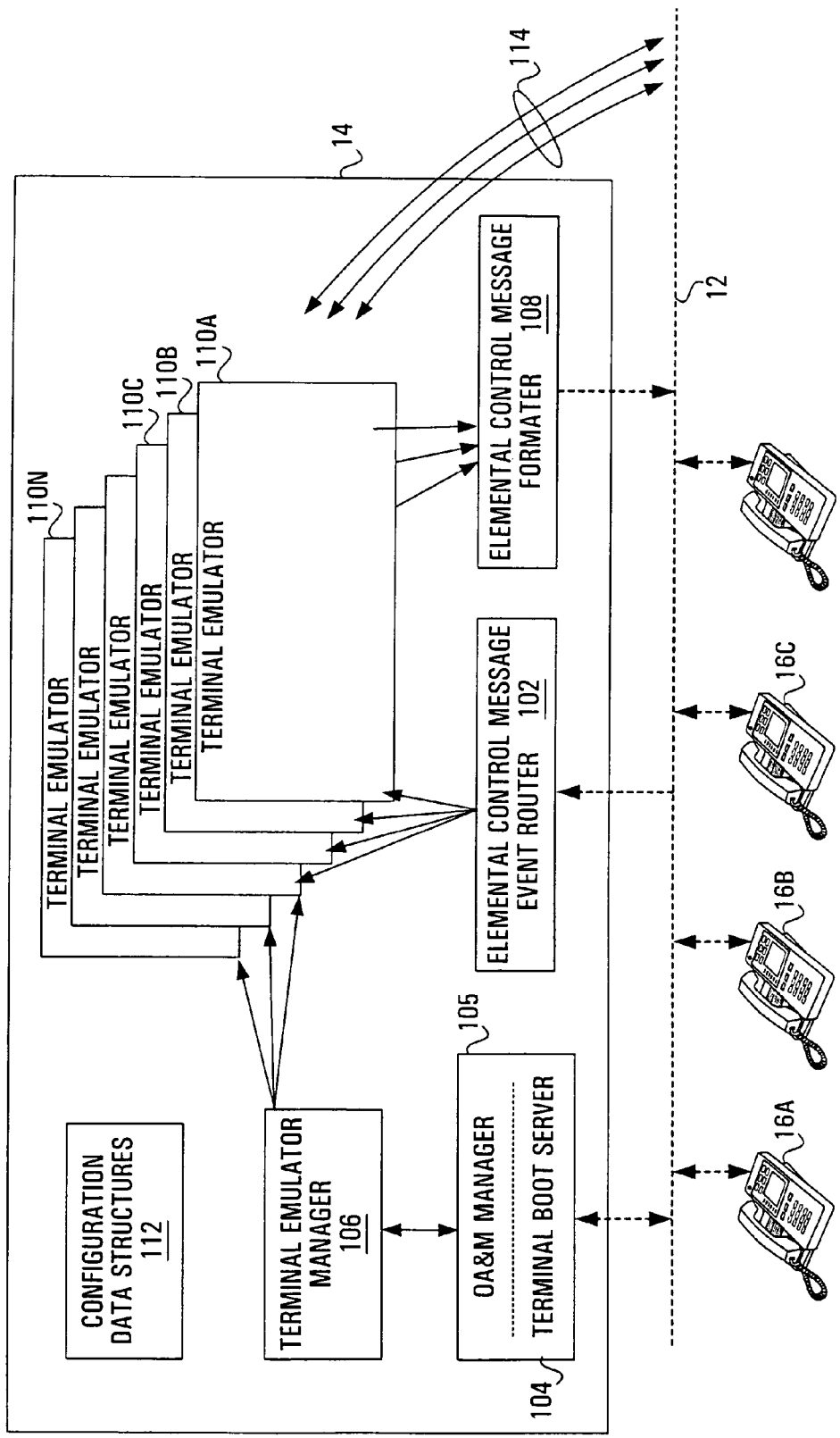
FIG. 3 is a functional block diagram of a portion of the system of FIG. 1 detailing the software architecture for the NI.

The architecture for the NI is illustrated in FIG. 3. Turning to FIG. 3, NI 14 comprises an elemental control message event router 102 which receives inputs from ITs 16a, 16b, 16c over the private IP network 12 and outputs to terminal emulators 110a, 110b, 110c. A terminal boot server 104 and an associated operations, administration, and maintenance (OA&M) manager 105 are connected for two-way communication with the private IP network 12 and with a terminal emulator manager 106. The terminal emulator manager manages the terminal emulators. The terminal emulators are connected for two-way communication with the private IP network 12 on lines 114 and also output to the network through elemental control message formatter 108. The NI also includes configuration data structures 112. Each configuration data structure correlates key codes with functions and, optionally, with text (or graphics) which explain the functions. Each configuration data structure also includes information sufficient to allow the launching of a service proxy for each of the functions.

Figure 4:
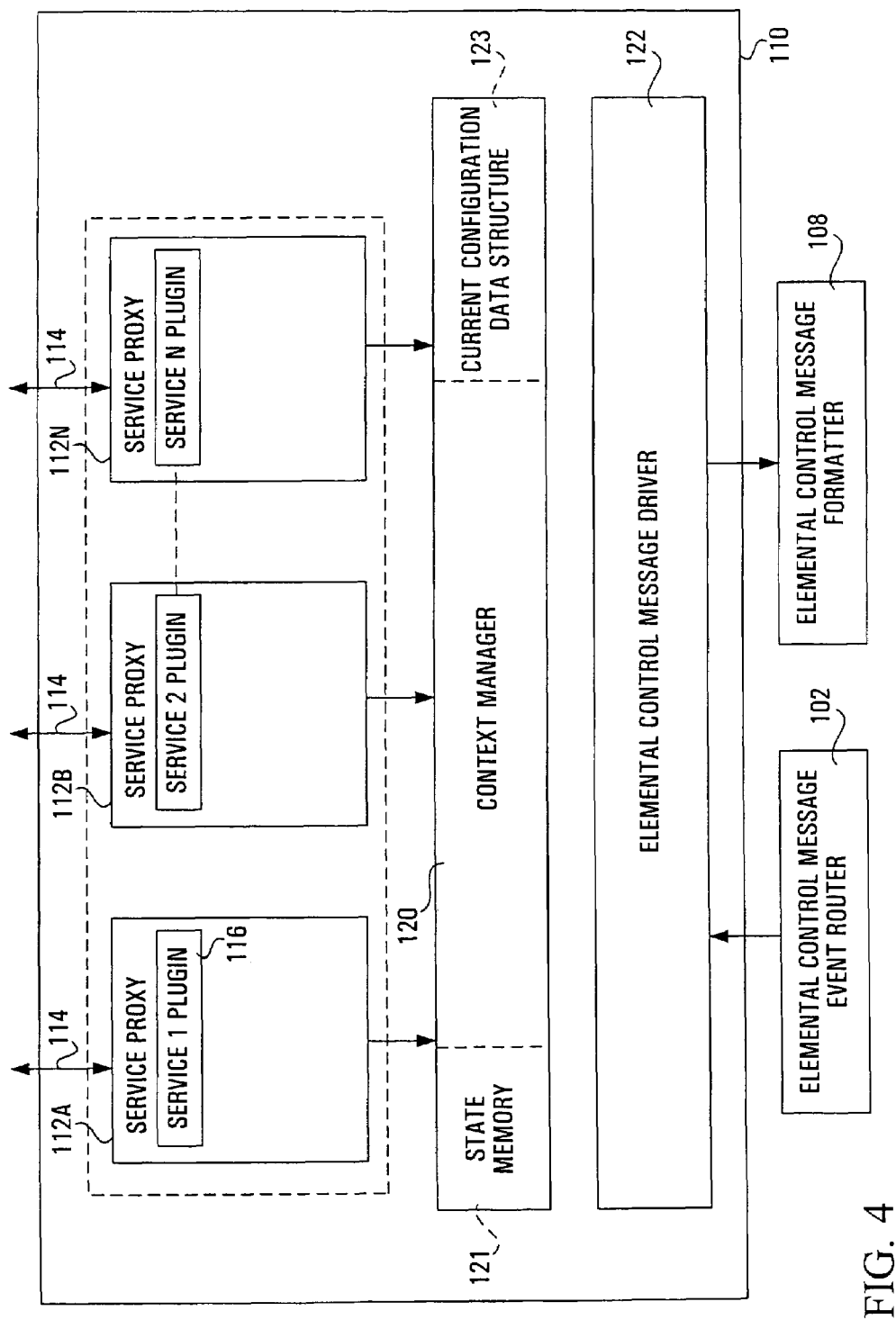
FIG. 4 is a functional block diagram detailing a portion of FIG. 3.

A terminal emulator 110 is detailed in FIG. 4. Turning to FIG. 4, emulator 110 comprises a number of service proxies 112a, 112b, 112n. Each service proxy comprises a service plug-in 116 which is connected for two-way communication with the private IP network on a line 114. The service proxies output to a context manager 120. The context manager is connected with an elemental control message driver 122. Elemental control message driver 122 receives inputs from the elemental control message router 102 and outputs to the elemental control message formatter 108.

The context manager includes a state memory 121 which stores current state data for the IT emulated by the terminal emulator. The "state" of the IT is the current status of elements of an IT, for example: "on hook"; "off hook"; "call on handset"; "call muted on handset"; "handsfree speaker connected". The context manager also has a memory 123 for a current configuration data structure.

When an emulator 110 is first launched, it will have no service proxies. However, as further explained hereinafter, service proxies are launched as required based on information in the current configuration data structure in memory 123. The service proxies may be proxies for providing telephony or data services available at processing entity 15, over the private IP network 12 (such as services 11 and 13), or over the public IP network 19 (such as services 21 and 23). For example, service proxies may provide basic telephony call services, a call messaging service, a directory number locating service (such as an LDAP—light weight Directory Access Protocol—service, which is described in ETF publications 1777, 1778, and 1823), a direction finding service (such as MAPQUEST™), a stock market quotation service, an audio program service, and a personalized service.

Referencing FIGS. 1 to 4, when an IT 16a is first plugged into the private IP network 12, the network manager of the IT (which is one of the functional element managers 80), using the dynamic host configuration protocol (DHCP) tries to find an NI. An appropriate message is therefore sent by IT 16a to the NI. The terminal boot server 104 of the NI recognises this message and prompts the terminal emulator manager 106 to launch a terminal emulator 110a for IT 16a. When terminal emulator 110a is launched, it looks to the configuration data structures 112 for an initial configuration data structure to associate with IT 16a. The configuration data structure is copied to memory 123 of the context manager 120 for the terminal emulator and will correlate each of the keys of IT 16a with a function and may also correlate keys with text (or a graphic) describing one of the functions. The NI then constructs elemental control reply messages to the IT 16a which include commands to control elements of the IT. For example, the display of the IT. 16a could be written with text (or graphics) from the configuration data structure for the function of keys of the IT.

If the DHCP is not available then, when an IT is first plugged in, it defaults to a temporary user input state where the window manager 76 is responsive to input from the keypad 28. Thus, a user may, via keypad 28, input an IP address for the IT and an IP address for an NI (as will be appreciated by those skilled in the art, the user may also be required to input an IP address of a gateway and a sub-net mask). Once this has been keyed in, the IT sends a "new IT" message to the NI IP address which was keyed in. This prompts the addressed NI to launch a terminal emulator, retrieve an initial configuration data structure for the new IT, and construct a reply message. When the IT receives the reply message, the window manager switches out of its temporary user input state.

All hardware devices generate events. In operation, if, say, a key is pressed on the key pad 28 of IT 16a, this key event is sensed by key pad driver 48. The keypad driver, recognising this as a signalling event, signals the key event interface 68. Only one event interface is supported per driver and the output of all of these processes is sent to the centralised event queue 74. Once the key event propagates through the event queue to the event dispatcher 78, the event dispatcher dispatches it to the key/indicator functional element manager 80. This functional element manager then formulates an elemental control message, opens a socket 86 on the IP protocol stack 75 and passes the elemental control message to the socket where it is passed down to the ethernet controller 30 for transmission to the NI.

Similarly, if an elemental control message is received from the NI by the ethernet controller, it is passed up to the event queue 74 where it propagates through to the event dispatcher 78. The event dispatcher then dispatches the elemental control message to the appropriate functional element manager 80 for action.

To ensure that the audio media streams incur the minimal amount of delay while propagating through the system, the driver APIs are designed to allow the media to bypass the event queue and event dispatcher and instead communicate directly with a stream handler 82 registered with the driver. The handling of a media stream begins with the NI sending appropriate elemental control messages to request processing of a new media stream. The audio functional element manager would then start a new process, a stream handler 82, to perform the stream processing task. If, for example, the elemental control message from the NI requested processing of an audio stream from a voice call, the functional element manager for the DSP 24 would open two stream handlers 82: one for receive stream processing and one for transmit stream processing. The receive stream handler would open a socket for the incoming stream of audio packets and the transmit stream handler would open a socket for an outgoing stream of audio packets. Both stream handlers would register the process identifier with the DSP driver. The audio stream arriving at the socket opened by the receive stream handler would pass directly to the receive stream handler where it would be sent on to the DSP driver 44 with the appropriate stream identifier. The driver would pass the audio stream to the DSP 24 which decompresses it; the stream is then converted to analog audio at codec 96 or 99 and passed to a speaker 90 or 97 of the IT. The DSP 24 also compresses audio received from a microphone 92 or 98 of the phone after the audio is digitised by codec 96. or 99. The DSP driver, upon reception of this audio data corresponding to a given stream identifier, signals the registered transmit stream handler matching the stream identifier; the transmit stream handler then reads the data from the DSP driver. Thus, more than one stream handler per driver can register for media streams.

When a media stream is originated from the IT to the outside world, the stream handler-responsible for managing the media stream opens, maintains and closes the required socket and hence writes the media packets directly to the socket.

The flexibility of the system described is illustrated in the following examples.

Referencing FIG. 1, assume on power-up of IT 16a, in response to the DHCP message from the IT, the NI 14 launched a terminal emulator 110a for IT 16a that retrieved an initial configuration data structure for the IT which, amongst other designations, designates (i) one key of IT 16a as a mute key to mute a transmit path, as is standard in telephony for a mute button, (ii) another key to request specialised call services, (iii) a further key to request telephone directory information, (iv) another key to request (street) directions, (v) another key to request stock market quotations, (vi) a key to request a specific audio program (such as a radio station), (vii) a key as a "quit" key for use in quitting a service, and (viii) keys to designate digits. The mute button and digit keys are typically permanently so identified on IT 16a. The "quit" key may also be permanently marked. For the other noted soft keys, the configuration data structure includes data which the NI uses to control the text display 26 of the IT 16a to indicate the function of these keys.

Figure 5:
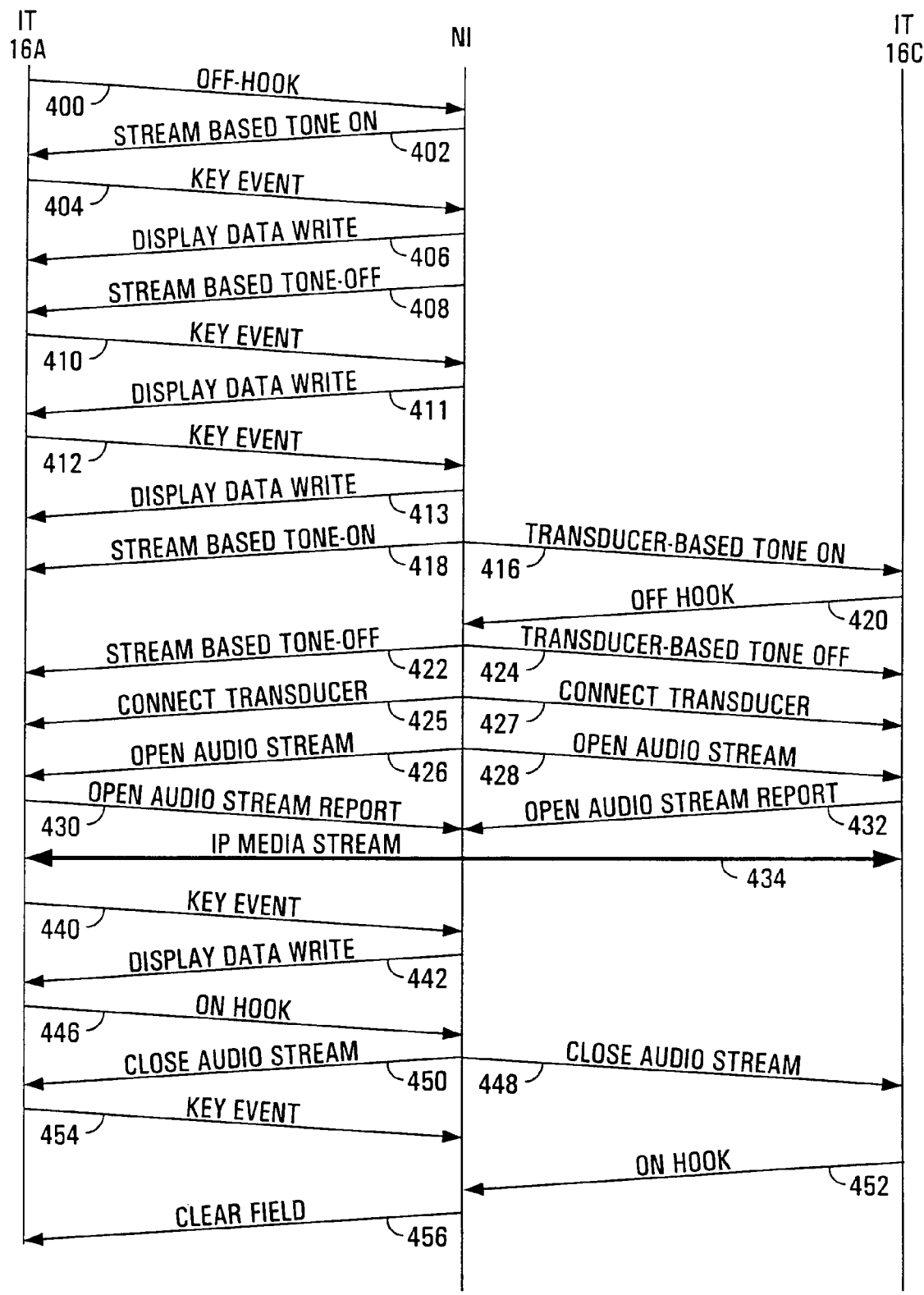
FIG. 5 is a process flow diagram.

Now referencing FIG. 5 along with FIGS. 1 through 4, if a user of IT 16a wished to place a call to IT 16c, she may first lift the handset of the IT 16a. This results in the key/indicator manager of IT 16a sending an "Off hook" elemental control message to the NI (S400). The elemental control message event router 102 of the NI receives this message then passes a request to the appropriate terminal emulator, here emulator 110a. The request passes up through elemental control message driver 122 and context manager 120 of emulator 110a to a service proxy, say 112b, for handling basic call service (the proxy being launched, if necessary). The service proxy sends commands back down through the context manager and elemental control message driver so that the elemental control message formatter 108 is driven to generate a "Stream Based Tone On" message with appropriate parameters (S402) to cause the audio manager of the IT to turn on a dial tone. At this point, the NI considers the IT to be in an "off hook" state.

Next the user may press a digit key on the key pad. This results in a "key event" message to the NI which includes the key code for the key which was pressed (S404). The NI collects the digit, echoes the digit back to the IT 16a for display in a "Display Data Write" message (S406) and sends a "Stream Based Tone Off" message to turn off the dial tone (S408). Next the user may dial a series of digits, resulting in a like series of "Key Event" messages to the NI (S410, S412) and a like series of "Display Data Write" messages from the NI (S411, S413) to cause the IT to display these digits. Once the basic call service proxy 112b of the NI has collected a series of digits representing a called station on the private IP network, it obtains the IP address of the called station, here IT 16c. The service proxy 112b of the NI then queries the state memory 121 of emulator 110c for IT 16c to determine the state of IT 16c. If IT 16c is in an on hook state, the NI may then initiate the call with IT 16c by sending a "Transducer Based Tone On" message to IT 16c (S416) with appropriate parameters to cause the audio manager of IT 16c to generate a ring cadence. The NI also sends such a message to IT 16a (S418) causing IT 16a to generate a ring back tone. If the user of IT 16c takes the phone off-hook, then IT 16c sends an "Off Hook" message to the NI (S420) causing the NI to send a "Stream Based Tone Off" message to IT 16a (S422) so that the ringing tone at IT 16a ceases and also sends a "Stream Based Tone Off" message to IT 16c (S424) so that the ringing cadence at IT 16c ceases. The NI then sends (i) a "Connect Transducer" message (S425, 427) and (ii) an "Open Audio Stream" message to each of IT 16a and IT 16c (S426, S428) so that (i) either the handset 94 or the handsfree speaker 97 and microphone 98 are connected at each IT and (ii) a voice session is set up between the phones. Thereafter each IT will send an "Open Audio Stream Report" message to the NI (S430, 432) and IP media stream packets will flow directly between the two phones (S434).

Say, during the course of the call, the conversation turned to stock prices. The user of IT 16a could press the key designated to provide stock market quotations. This would result in a "key event" message being sent to the NI (S440) which is routed by router 102 to terminal emulator 110a. Emulator 110a refers to the current configuration data structure in memory 123 to access a service proxy application corresponding with the key code in the received "key event" message, in the current example, this is a stock quote service proxy application. The emulator 110a then launches this service proxy as, say, service proxy 112a. Proxy 112a then negotiates a connection with the server (i.e., the data source) providing this stock quote service, which server may be located on public data network 19. The remote server then addresses packets of characters to the NI 14. Emulator 110a of the NI then sends a "Display Data Write" message to IT 16a (S442) to pass the characters to the IT 16a for display. Thus, while continuing the voice call with IT 16c, the user of IT 16a may receive stock quotation information (which may occupy a portion of the display of the phone).

When the user of IT 16a requests connection to a stock quotation source, this could prompt the context manager 120 of emulator 110a to look up a new configuration data structure for IT 16a which would assign a different function to certain of the keys of the IT. For example, the star and pound keys on either side of the 0 key could be re-assigned to a "scroll up" and "scroll down" function, respectively. The NI could then send a "Display Data Write" message to the IT so that the phone display indicates this new function of these keys. Then, when the user pressed either of these keys, the NI, on receiving a "key event" message, would send an appropriate IP message to the remote server to request the next, or previous, page of information. In response, the remote server would send new packets of characters causing the NI to re-write the display of the IT 16a with the new characters using a Display Data Write message.

To end the voice call, IT 16a may be placed on hook. This results in an "On Hook" message being sent to the NI (S446). This prompts the NI to send a "Close Audio Stream" message to each of IT 16a and 16c (S448, S450). Thereafter, an "On Hook" message may be received from IT 16c (S452). To end the stock market quotation service, the user may press the "quit key" resulting in a "Key Event" message to the NI (S454). The NI responds with a "Clear Field" message to IT 16a (S456) to cause the portion of the display used for the stock quotation information to be cleared. Internally, emulator 110a of the NI would either suspend or terminate the stock market quotation proxy 112a.

Figure 6:
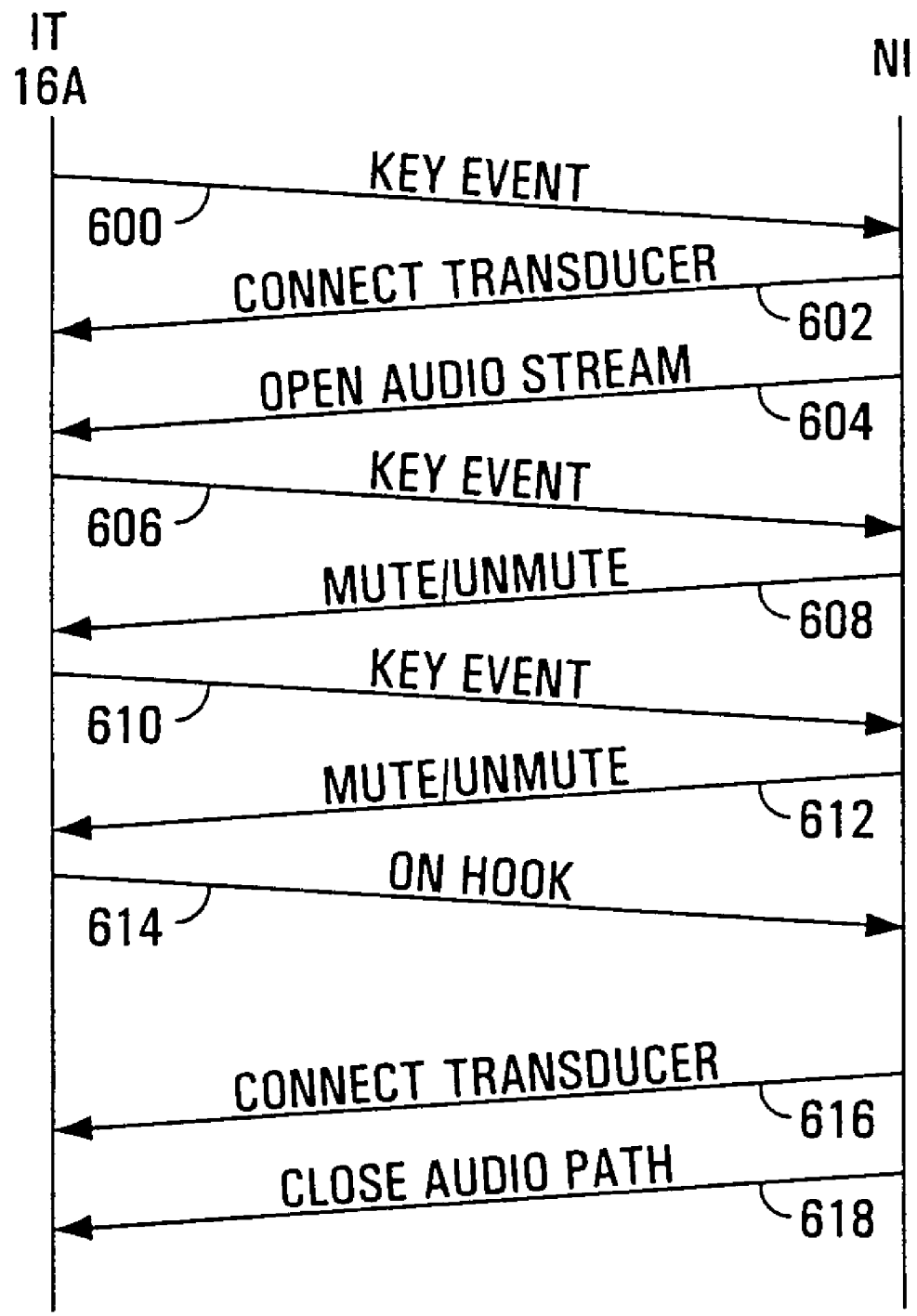
FIG. 6 is another process flow diagram.

Turning to FIG. 6 along with FIGS. 1 through 3, with IT 16a idle, the user of IT 16a may now decide she wishes to listen to the radio station indicated on the display as associated with a soft key. The user therefore presses this key resulting in a "Key Event" message being sent to the NI (S600). In response, the emulator 110a of NI 14 launches an audio program service proxy, say, 112b, which negotiates a connection between a remote server which is the source for the appropriate audio program and IT 16a. Meanwhile, the emulator 110a sends a "Connect Transducer" message to IT 16a (S602) indicating the new media stream should be directed to the handsfree speaker 97 and an "Open Audio Stream" message (S604) to launch a receive stream handler which opens a socket for the incoming audio program packets from the remote server and directs them to the DSP driver. Additionally, the pressing of the audio program key causes the emulator 110a to retrieve a new configuration data structure for IT 16a which re-assigns the function of the mute button on the IT so that its function is to mute the receive path of the handsfree audio transducers rather than the transmit path. Thus, if someone enters the office of the user of IT 16a, the user may press the mute button to send a "Key Event" message to the NI (S606); the NI responds with a "Mute/Unmute" message with a parameter causing the IT to mute the receive path (S608). The user of the IT may then conduct a conversation with the visitor and, thereafter, again press the mute key, so that the NI send a "Mute/Unmute" message with appropriate parameters such that the receive path for the audio program is again unmuted (S610, S612).

When the user wishes to stop listening to the audio program, she may end the service by pressing the "quit" key on the IT resulting in an "Key Event" message to the NI (S614). The NI responds with a "Connect Transducer" message which disconnects the handsfree speaker of the phone (S616) and a "Close Audio Path" message to shut down the stream handler and associated socket for the audio program (S618). Thereafter, the NI retrieves the previous configuration data structure for IT 16a so that the function of the mute button is internally re-assigned whereby it can be used to change the state of the IT to mute the transmit path.

If, while the user is listening to an audio program a call for IT 16a reached the NI, the NI would send one or more Display Data Write messages to the IT 16a to emulate a pop up window announcing the call (preferably with caller information) and asking the user to press a certain key to indicate that she wishes to take the call. This may be accompanied with a message which would result in a brief alerting tone at the IT. The NI retrieves a new configuration data structure for the IT which includes an assignment of one of the keys to an indication that the call is to be taken. If the user did not press this key, once the caller hung up, the NI would clear the pop up window and restore the previous display contents. If the user did press the key, then the NI may suspend or terminate the audio program session and connect through the call, as afore described. Optionally, a second key could indicate that the call was to be taken and the audio program continued. If the user pressed this key, the NI sets up the voice call on the handset 94, keeping the audio program on the handsfree speaker 97. By deciding upon whether to interrupt the user, the NI may provide for a prioritisation of services.

If, while the IT was busy with a voice call on, say, the handset 94, the user pressed the telephone key which is associated with a display message indicating an audio program (e.g., radio station), a "Key Event" message would be sent to the NI. Recognising the current state of the phone as busy with a voice call, the NI would recognise providing the new audio stream would potentially conflict with the voice call. Consequently, the NI sends a notification to the user. For example, the NI could highlight the usage conflict in a Display Data Write message. Also, the NI retrieves a new configuration data structure for the IT which re-assigns one key of the phone as a "warning override" key. The user could override the warning with the appropriate key press in which case the audio stream for the audio program is set up over the handsfree speaker 97, as described in conjunction with the example of FIG. 6. However, in this instance, the NI may assign a special key for the function of muting the handsfree speaker 97, leaving a mute key to mute the voice call in the standard fashion.

From the foregoing, it will be apparent that the IT may simultaneously deal with audio streams from different sources. Indeed, the user could even take two separate voice calls at the IT: one on the handset and one on the handsfree speaker and microphone. In such instance, should a key be pressed requesting an audio program, the NI could either ignore the key event message as there is no way to provide this service without conflicting with the existing voice calls or could display options to the user for dealing with the conflict.

As previously mentioned, another exemplary proxy which may be run on the terminal emulator is a directory number locator proxy which may be used to find telephone numbers over the public IP network. If a user of IT 16*a* requested a search for a directory number (by pressing the appropriate key), the NI would launch a directory number locator proxy 112*a* in terminal emulator 110*a*. Possibly, this would also cause the NI to retrieve a new configuration data structure for the IT 16*a* and send a "Display Data Write" message to the IT to display new functions for certain of the keys of the phone which would facilitate a user's use of the directory finding service. For example, the digit keys could be reassigned to represent letters so that the user could key in a name. If the user entered a last name, the NI could respond with a list of "hits" through "Display Data Write" messages and retrieve another configuration data structure for the IT 16*a* which assigns new functions to certain keys to allow handling of the list. One of these new functions could be a "copy" function which may be used to copy information from one data service to another. Thus, in this instance, a user could copy a name from the list of "hits" to, say, a personal address book in a call messaging service. Each configuration data structure tailored to a particular service will normally still provide keys by way of which the user could request other services. If the user pressed a key to request stock market quotations, this would cause the NI to launch a stock market quotation proxy 112*b* in emulator 110*a* and, possibly, retrieve another new configuration data structure for the phone and overwrite portions of the display to indicate new key functions according to this new configuration data structure. In this way, the last function key which is pressed sets the current configuration data structure for the phone, and a user could "toggle" amongst services. Thus, a number of proxies may run on the terminal service emulator 110*a* simultaneously but only the proxy most recently requested by a key press is the active proxy, the other proxies are in the background. From this it will be apparent that the NI provides an aggregation of services for the ITs, including many services not normally associated with a telephone.

The described text-based services were assumed to provide packets of characters to the NI. Some services, such as web pages on the world wide web, forward a file written in hypertext mark-up language (HTML) which file typically prompts down loading of further files to allow construction of a web page. To accommodate such services, the IT 16 may be provisioned with a graphics display along with an associated graphics driver and graphics event interface. Additionally, the ITs are provisioned with a graphics manager and the elemental message protocol is enhanced by the provision of graphics manager elemental control messages. This manager and the new messages will be very similar to the display manager and the display manager elemental control messages. Thus, the protocol will include a "Graphics Data Write" message similar to the "Display Data Write" message.

When a user requests a graphical service which uses the hypertext transfer protocol (HTTP), the NI will receive the HTML file and download necessary additional files to construct the web page. The NI will then encapsulate web page information in "Graphics Display Write" messages to cause the web page to be written to the graphical display of the IT. In so doing, the NI may also retrieve a new configuration data structure for the IT which will assign keys different functions, such as functions to navigate through the web page or request a hyperlink. If, for example, the NI receives "Key Event" messages indicating a hyperlink has been requested, the NI down loads information from the appropriate source(s) and updates the graphical display of the IT with new information received.

With a graphics capable display, if the IT also included a new functional element manager 80 for the display, namely, a video manager, then the NI could control the display in the same manner as it controls the audio transducers, provided the elemental control protocol were enhanced with suitable additional commands. More particularly, the configuration data structure for an IT 16*b* could assign one key to a request for a video program (such as a close captioned news program). Were this key on IT 16*b* pressed, the NI would launch an appropriate proxy in emulator 110*b* which would negotiate a connection between a remote server providing this video service and IT 16*b*. The NI would also send an appropriate elemental control message to IT 16*b* which results in the video manager of IT 16*b* opening a receive stream handler, registering it with the display driver and opening a socket 86 on the IP stack 75. Thereafter, when the video stream reaches the ethernet controller 30 and is passed up to the socket, it is received by the receive video stream handler and passed down to the display driver. It will therefore be apparent that the user of IT 16*b* could, while continuing with a voice call, view, for example, a close captioned news service.

The various proxies which may be launched in the terminal service emulator are written so as to be compatible with the protocol of the service provided on the remote server. These different protocols are therefore transparent to the ITs. A few exemplary data services which may be provided at an IT by the NI have been mentioned hereinbefore, such as a directory number locating service (e.g., using LDAP), a map/navigation service (e.g., MAPQUEST™), a stock quotation service (e.g., QUOTE.COM™), and an audio streaming service (e.g., REAL AUDIO™, MPEG3). Additional exemplary services include a weather information service (e.g., EARTHWATCH™) and a Short Messaging service (e.g., AIRTOUCH™).

Another exemplary data service which may be provided at an IT by the NI is an event notification service. With this type of service, a user of a data terminal inputs certain criteria to the service; when these criteria are met, the service typically sends an e-mail to the data terminal. For instance, a user may ask to be notified if the price of certain merchandise falls below a specified price level, or if merchandise is re-stocked. If an IT requests this service, the NI emulates a data terminal to the event notification service such that the service presents its user interface (UI) to the NI. The NI then sends appropriate messages to the IT to reflect the UI at the IT. Based on keypad input from a user of the IT in reply, the NI sends appropriate messages to the service in order to specify criteria desired by the user. When the criteria are met, the NI is notified from the service (typically by e-mail and/or through the UI of the service) and the NI may, in response, control the IT to provide a notification. This notification at the IT is not restricted to a text-based display, but could, for example, constitute a distinctive ringing signal and/or a graphical display.

User interfaces for data services on an IP network are typically based on hypertext mark-up language (HTML). Thus, NI 14 need only be provisioned with HTML capability in order to interface with such services.

Data services typically require text based queries. However, the NI may allow a user of an IT to request voice input for a given service (by an appropriate "Key Event" message). On receiving such a request, the NI launches a service proxy for a speech recognition service (e.g., OPENSPEECH™) and then establishes a media channel between the IT and itself. Speech received by the NI over this media channel is then passed to the speech recognition service which returns text based equivalents to the NI. The NI may then pass the text based equivalents to the given service.

Alternatively, the telephony system 10 may be configured so that when an IT is first plugged in, its NI launches a service proxy for a speech server and opens a microphone of the IT and a media channel from the IT to the speech server. With such a configuration, voice input for a data service may be requested by way of a distinctive utterance by the IT user.

A high security service might require voice recognition before the service is unlocked. In such instance, through a service proxy, the NI may direct establishment of a media channel between the IT and the high security service.

An NI may also readily provide an e-mail service to an IT. E-mail sent over the public network 19 addressed to an IT will be received and stored by an e-mail server and accessible by the NI, as enabled by an e-mail client service proxy. As e-mail is received by the e-mail server, the NI resident e-mail client data is updated. The NI may then send a "Display Data Write" message to the appropriate IT which indicates the new mail item. Notification of new e-mail may alternatively, or additionally, take the form of a distinctive ringing signal and/or a graphical display preferably when e-mail with a specific originator and/or specific subject heading and/or specific body text is received. To implement this requires that the e-mail client in the NI compare portions of incoming e-mail with stored search targets. The NI will choose a configuration data structure for the IT such that a key of the IT may be used to request e-mail messages. If a "Key Event" message is received by the NI indicating a request for e-mail messages, the NI will cause the IT display to display summaries of e-mail messages and will load a new configuration data structure for the IT such that keys of the IT may be used to handle the e-mail messages. Thus, for example, with an appropriate subsequent key press, the NI will cause the IT display to display the text of a selected e-mail message.

As aforementioned, call services are handled in the same fashion as data services: the NI launches a service proxy to access a server which provides the desired service. For example, it is possible to deliver voice mail in an identical fashion to that described for e-mail, with speech being the payload rather than text (CALL PILOT™ is an exemplary voice mail service which operates in this fashion).

Since all of the keys of the IT are soft keys, the IT may display text in association with each of its keys which includes function information provided by the NI. Alternatively, certain keys found on the IT, such as hold, mute, handsfree, volume control, screen navigation, and headset on/off keys, may be permanently labelled as such. Notwithstanding, these permanently labelled keys are soft keys since their function is assigned at the NI. Thus, their function may be re-assigned where necessary (such as described in conjunction with the foregoing example in respect of the mute key). The ability to control all of the keys on the telephone ensures that the NI may provision the ITs with a variety of services, without conflicts amongst the services and without conflicting with voice calls.

While it is preferred that all of the keys of each IT are soft keys, the system of this invention could function even if some keys of an IT were "hard wired". For example, the mute key of an IT could be hard wired to mute the transmit path of the phone. In such instance, were a user to request an audio program service, the NI could still allow muting of the receive path through assigning this function to a soft key on the phone.

While the user input elements of the telephone have been described as keys (and the hook switch), it will be appreciated that the telephone could equally have other user input elements, such as a touch screen (i.e., a screen where x and y co-ordinates are obtained from a touch sensitive matrix) and proximity or motion detectors. If so, appropriate protocol messages would log signalling "events" from these devices. Also, while the functions have been described as associated with single keys, it could be that the NI requires a series of key presses on the part of a user to request a function.

The DSP in each IT provides data compression. If the bandwidth of the network is sufficiently great, or if compression is accomplished in some other manner (such as with a network transcoder), the DSPs may be omitted.

The configuration data structures 112 (FIG. 3) may be different for each IT. Thus, the configuration data structures may be based on user profiles. In this way, different phones on the private IP network may request services from a different set of services.

The NI may also provide the functional emulation for IT 16*d* on public IP network 19. Also, the NI could be directly connected to the public IP network 19 instead of to a private IP network and may provide the functional emulation for any ITs connected directly or indirectly to the public IP network. The NI acts as a proxy agent for the IT by converting messages received from the IT to appropriate standard or proprietary protocol. Thus, for example, referencing FIG. 1, an Internet Protocol (IP) telephone 27 on the public IP network 19 may utilize H.323 protocol in the establishment of telephone calls. As will be understood by those skilled in the art, the H.323 protocol has been established by Study Group 16 of the International Telecommunications Union (ITU) and is detailed in overview in http://www.webproforum.com/trillium/index.html, the contents of which are incorporated herein by reference. If a user of one of the ITs controlled by NI 14, say IT 16c, dialled a number for such an IP telephone, the NI would receive "Key Event" messages from IT 16c. The user may also send "Key Event" messages to specify the protocol to use. Based on these received messages, the NI would send appropriate H.323 protocol messages to the IP telephone 27 and its gatekeeper 29 to establish the call. To do so, the NI would need to be provisioned with software for implementing the H.323 protocol. This software would typically be configured as a Service Proxy, say 112b in FIG. 4, through system administration, and may be dynamically loaded when a connection is requested to an IP telephone utilizing the H.323 protocol. A user of IT 16c could directly specify a call protocol or after dialling a number or specifying a name using IT 16c, a directory reference by the NI (using LDAP protocol for example) would return a field specifying the call service(s) (and associated tariffs) through which a Directory Number (DN) could be reached, and hence, the appropriate protocol(s) (e.g. H.323).

An IP telephone on public network 19 could also use a different protocol for the establishment of a voice call, such as Session Internet Protocol (SIP) which has been established by the Internet Engineering Task Force (IETF) and is detailed in IETF RFC 2543 dated March, 1999 (available at http://www.sunsite.auc.dk/RFC/rfc/rfc2543.html), the contents of which are incorporated herein by reference. The NI could allow establishment of calls between such IP telephones and ITs which it controls provided the NI is provisioned with software to implement the SIP protocol through a service proxy.

Of course, as these standards-based call initiation protocols evolve, the software in the NI may be updated to reflect the latest version of the standard.

While the multi-service telephony system has been described in the context of an IP data network, the system could be adapted to function in the context of data networks following other data protocols. For example, rather than sending packetised data, the data network could employ a synchronous transfer mode for data.

The NI could also allow an IT to communicate with a telephone on a non-IP network 25, such as an integrated services digital network (ISDN). To do so, the NI 14 would need to have a connection to the ISDN through a gateway 31 and be provisioned with software allowing it to emulate an ISDN terminal. The gateway converts between ISDN signalling and media streams, on the one hand, and packet data on the other. If an ISDN signalling stream arrives at the NI from the gateway, the NI launches a service proxy to handle the ISDN messaging with the ISDN terminal in order to establish a call with a desired IT. Thereafter, the ISDN media stream is directed to the IT (through the gateway) while the NI continues to receive any messaging via a signalling stream.

In a similar fashion, if the NI, through an appropriate gateway, had a connection to a wireless network operating under any standard wireless protocol, such as GSM, TDMA, CDMA, or G3, and was properly provisioned to emulate a wireless telephone terminal operating under the wireless protocol, the NI could permit the establishment of a voice call between a telephone on the wireless network and any of the ITs.

The NI could also permit an IT to establish a call over a proprietary network if the NI had a connection to such network and the NI were provisioned with the proprietary protocol for establishing a call over the proprietary network. Thus, for example, the NI, if properly provisioned and connected, could allow calls between an IT and a telephone on a MERIDIAN network or a NORSTAR network (MERIDIAN and NORSTAR are trademarks of Nortel Networks Corporation).

If properly provisioned, the NI may emulate any type of terminal supported on a network. Thus, for example, the NI may emulate a pager on a wireless network if provisioned with proper interface software (e.g., Wireless Application Protocol—WAP, Wireless Markup Language/Handheld Device Markup Language—WML/HDML) which is utilised by a service proxy. In providing pager emulation, the NI could receive a pager message destined for one of the ITs and construct appropriate "Display Data Write" elemental control messages to cause display of the text of the pager message at the appropriate IT.

The NI may also emulate proprietary services if enabled by an appropriate Service proxy. For example, text messages may be dispatched to an IT from a COMPANION server via an appropriately configured NI. (COMPANION is a trademark of Nortel Networks Corporation).

There are situations where it is desired to have a server control telephones and also a personal computer (PC) adjacent each telephone. For such situations, a computer telephony interface (CTI) protocol is needed. Microsoft's TAPI provides a common application programming interface (API) for service providers, and those writing telephony applications for servers or PCS running the WINDOWS™ operating system. In known call centers, for example, the telephone at each workstation is connected to a private branch exchange (PBX) and a server is connected to the PBX and to the client PC at each workstation. Software resident on the server co-ordinates phone activity with information displayed on the client PC's screen. Many systems use Novel/ATT TSAPI to enable control of a PBX by a server.

Figure 7:
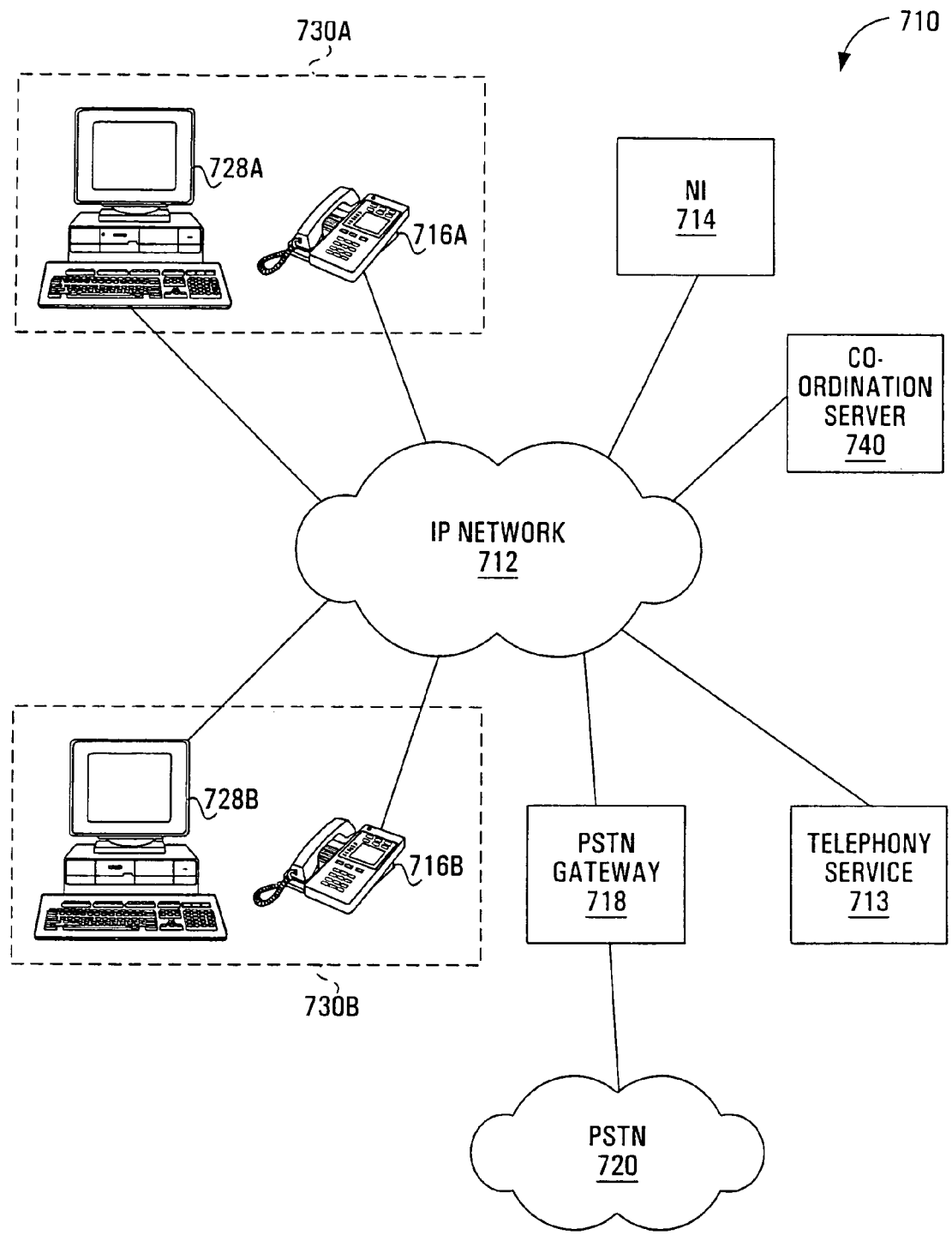
FIG. 7 is a schematic diagram of a telephony system made in accordance with another embodiment of this invention.

Telephone and PC control may be achieved with the teachings of the subject invention without the need for a line between the telephones and a telephone switch (e.g., PBX). Turning to FIG. 7, a system 710 comprises an IP network 712 connected to a telephony service 713, an NI 714, ITs 716a, 716b and PCS 728a, 728b of workstations 730a, 730b, a PSTN gateway 718, and a co-ordination server 740. The PSTN gateway 718 is connected to a PSTN 720.

The co-ordination server 740 controls the PCS directly over the IP network 712. The co-ordination server 720 controls the ITs through the NI 714, which launches a suitable service proxy for each telephone. For example, if the co-ordination server 740 used the TAPI protocol, the NI would proxy a TAPI client on behalf of each IT. It would also be possible to architect system 710 such that the co-ordination server generates elemental control messages. These would then flow to the NI where they would be aggregated and prioritised with respect to other services.

When the NI 714 launches a service proxy in respect of an IT for the co-ordination server 740, the NI 714 may upload a new configuration data structure for the IT which associates an "expand" operation with one of the keys of the IT. A suitable "Display Data Write" message to the IT will result in this key being suitably identified at the IT. In response to a "Key Event" message from this "expand" key, the NI sends a message to the co-ordination server 740 such that server 740 controls the PC at the same workstation to display information viewed in short form on the smaller IT display in an appropriate expanded format on the PC.

With the architecture of system 710, it is also possible for PC 728a at workstation 730a to run an application which communicates with the IT 716a at the workstation through the NI. The application may communicate with the IT via the NI either in a CTI protocol, such as TAPI, or utilising the elemental control protocol. Thus, for example, the PC could run a scheduling program with a scheduling summary appearing on the IT display. This could be useful where the PC was running a parallel application that occupied the screen of the PC. (In this situation, an "expand" key on the IT could be used to pop the background scheduler application on the PC to the foreground.) Note that the PC control of the IT occurs without any direct connection between the PC and IT. Although, typically, a PC would control on the IT adjacent to it at a workstation, the system 710 could allow a PC to control remote ITs as well.

Conveniently, the service proxies may be implemented in the JAVA programming language, as this facilitates their portability across NIs implemented in different software languages, hardware platforms, and operating system environments.

In the described systems, the intelligence for the operation of the IT is located in the NI. The functional model for the IT resides in the NI and the user interface is projected onto the IT using the elemental control protocol. This model results in a slight delay at the IT whenever a key is pressed as a key event message must pass up to the NI and a response message must return from the NI to the IT before the IT takes action consequent on the key press. In most instances, this slight delay is entirely acceptable. In the case of receive volume adjustments, this delay is not preferred. Consequently, the elemental control message protocol allows the NI server to configure the terminal for local, receive volume control. This is accomplished using several messages.

A two-mode operation scheme allows the NI to specify whether the terminal has direct control over active-path volume adjustment or if the NI will assume control over the adjustments. The two modes are defined as follows:

"Remote Mode": The NI controls all volume adjustments. The terminal forwards volume key events to NI to be interpreted, then the NI instructs the terminal to adjust the active volume register accordingly.

"Local Mode": The Terminal controls all volume adjustments directly. The terminal still forwards volume key events (if enabled), but the terminal interprets the volume key events and increments or decrements the active volume register directly.

The NI can instruct the terminal to operate in either mode, by setting the "Adjust Volume" and "Automatic Adjustable Rx Volume Report" options of the "Audio Manager Options" elemental control message. If the "Adjustable Rx Volume Report" option of the "Audio Manager Options" message is enabled, the terminal will send an "Adjustable Rx Volume Report" message each time after a volume key is pressed by the user. This report informs the NI that the volume has been adjusted and indicates whether one of the rails (min./max. volume) has been reached. This provides a clean interface for NI visual feedback of user volume adjustments when the IT handles the volume control locally.

The NI uses the "Change Adjustable Rx Volume" message to adjust an active path receive volume when local volume control handling has been disabled. The NI uses the "Adjust Default Rx Volume" message to change the default receive volume levels when a user is adjusting default volume levels from, for example, an options list. As will be noted from the protocol, the NI may set audio parameters for the handset or handsfree transducers (headset, where extant) in an audio parameter bank (APB) download message. The "Select Adjustable Rx Volume" message can be used by the NI to set or change the active APB volume register. This is useful when multi-path calls are configured and the user wishes to adjust the volume of a specific register (i.e. receive volume register associated with a specific APB).

There is also a situation where maintaining the functional model for the IT solely in the NI would be unnecessarily burdensome, namely, in implementing timers. There are many user interface features that require a time-out function to expire if no user activity is detected for a certain period of time. An example of such a feature is the viewing of a caller's list. When the user enters the list, as each new item is viewed, a timer is started. If the timer expires before the next list item is viewed, or the list is exited (signalled by a 'Quit' key press), the system will automatically exit the list and revert back to the 'Idle' display screen. The concept of a 'time-out if no key press' feature is very simple. This, along with the undesirability of maintaining possibly thousands of timers in the NI, one per each terminal, lead to a elegant solution: Perform the timer -feature in the terminal and send back time-out notifications to the NI to ensure that the NI is in-sync and in control of the user interface.

The "User Activity Timer" message is used to turn on or to turn off a timer, which reloads when any key is pressed. If the timer expires, meaning no keys were pressed, then the terminal sends the "User Activity Timer Expired" message. The "User Activity Timer Download" command allows the NI to specify the time-out value.

Another timer which may be present in the IT is a local call duration timer. Also, an IT may have a local time and date display (set by the NI) and will locally manage the current NI to which it responds (through the window manager). There are text strings displayed in conjunction with each of these functions. In order to maintain language independence with this local functionality, the NI downloads text strings in the appropriate language, as follows.

The Call Duration Timer uses the time & date fields to display its information. The date field is used for displaying the Call Duration Timer label (i.e., a text string) that can be defined by the NI using the "Call Timer Label Download" command. By allowing the NI to download a separate label for this feature, the locally implemented feature remains language independent as the downloaded label may be implemented in any language.

The IT is configured to track the month field digitally, i.e. 1=January, 2=February, etc. However, to allow a text label to be used, while at the same time ensuring language independence, the terminal allows two month labels to be downloaded via the NI. These labels are applied to "this" month and "next" month. The terminal tracks the number of days per month and automatically switches to the next month at the appropriate time. The NI downloads the month labels via the "Month Labels Download" message.

The elemental control message protocol provides a message which allows the NI to download a text string (or optionally an icon/bit map etc. as graphical display capabilities are deployed) to be used as the server identification tag in the local user interface. The NI uses the "Server Identification Tag" message for this purpose.

An advantage of the elemental control message protocol is the control it provides the NI over the characteristics of audio at an IT. As discussed previously, the NI may control an IT to connect audio streams to a selected transducer pair (e.g., handset, headset or handsfree microphones and speakers). In addition, the NI may control parameters of an audio stream by assigning an Audio Parameter Bank (APB). The APB is a grouping of parameters that describes the characteristics of the audio stream. The IT provides several APBs. Each APB can be configured by the NI. When setting up an audio stream, the NI controls where the audio stream terminates (i.e. which transducer pair to use), and which APB to associate with the audio stream. An APB contains the following parameters:

- RLR—Receive Loudness Rating.
- SLR—Send Loudness Rating.
- STMR—SideTone Masking Rating.
- Transmit/Receive Filters.
- Transmit/Receive Filter Gain Compensation (FGC).
- Receive volume range (minimum/maximum volume).
- Receive volume step size.
- Default and current receive volume level as well as Return To Default (R2D) enable/disable switch.
- AGC—Automatic Gain Control.
- SWL—Switched Loss.

The NI configures these APB parameters using the following elemental control message commands:

"APB Download", "Set APB's Rx Volume Levels", "Adjust APB's Tx and/or STMR Volume Level", "Frequency Response Specification", "Voice Switching Parameter Download", "Change Adjustable Rx Volume" and "Adjust Default Rx Volume."

The elemental control message protocol allows the IT to implement handset detection algorithms and report the findings back to the NI via the "Handset Connected" and "Handset Disconnected" messages. This flexibility allows the terminal to detect specially designed handsets, for example extended frequency response handsets, and report this to the NI. The NI, upon receiving this message, could activate enhanced audio capabilities within the terminal to exploit the capabilities of the special handset. These enhanced audio capabilities could be used as a product differentiater in the market.

The elemental control message protocol allows the IT to be configured to switch to a new control protocol. Upon receipt of the "Protocol Switch" message from the NI, the terminal could be directed to start communicating using the newly specified protocol instead of the elemental control message protocol of Appendix A. This would allow one terminal to be built that could be compatible with several distinct control protocols.

The elemental control message protocol allows the NI to query the IT for a 'copyright' identification string. The NI queries the IT using the "Copyright" option of the "Query Network Manager" command. The IT responds with the "Copyright Report" message.

The amount of information to be presented to a user may exceed the visible area of the display for the IT. This may typically occur when viewing e-mail, directories, or incoming callers logs. To accommodate such situations, the elemental control message protocol provides for page scrolling. The NI may send a "page" of information via a "Page Download" message. The IT saves this "page" of information locally and presents the first portion of the page on the display. If a user uses a page scrolling key (such as a key on a navigation cluster, or another key assigned to this purpose by the NI), on receiving the resulting "Key Event" message, the NI responds with a "Page Scroll" message, causing the IT to scroll to another portion of the "page".

The elemental control message protocol allows the NI the disable specific portions of the display via the "Disable Display Field" message. Once disabled, all writes to this portion of the display are saved in an off-screen buffer but are not visible on the screen. To enable the field, the NI sends a second the "Disable Display Field" message with the associated field bit enabled. Once enabled, the previously 'hidden' information is displayed on the screen.

Other modifications will be apparent to those skilled in the art

APPENDIX A

Broadcast Manager

NI to IT Broadcast Commands
- Logical Icon Update
- Time and Date download
- Set Default Character Table Configuration Logical Icon Update
The Logical Icon Update command is used for updating the state of a logical icon. The IT keeps a map of the association between logical and physical icons. When the state or cadence of a logical icon changes, the NI sends this command to update the corresponding physical icon with the new state and cadence.

| Parameters: | Logical Icon ID | specifies logical ID of icon to be updated |
| --- | --- | --- |
| | Icon State | specifies desired state of icon |
| | Icon Cadence | Off |
| | | On |
| | | Flash |
| | | Flicker |
| | | Wink |
| | | Twinkle |
| | | Blink |
| | | Downloadable cadence |

Time and Date Download
The Time and Date Download command is used to set the IT's time and date. This new time and date will overwrite the current time and date data stored in the IT. The command contains the year, month, day, hours, minutes and seconds. All numbers are expressed in hexadecimal.

Parameters:
- Year
- Month
- Day
- Hour
- Minute
- Second

Set Default Character Table Configuration
This command downloads the default character table configuration that the display manager uses. It specifies the mapping of the character tables to graphics tables and it also specifies which one of the graphics table is to be lock-shifted (code A0 to FF hex).

IT to NI Broadcast Commands
None

Network Manager
The Network Manager is responsible for configuring and maintaining the network connections between the NI and the IT.

NI to IT Network Manager Commands
- Soft Reset
- Hard Reset
- Query Network Manager
- Network Manager Options
- Control Channel QoS Configuration
- Reserve UDP Port Block
- Server Identification Tag
- Set RTCP Source Description Items
- Protocol Switch Download Backup Server Information
Server Switch
Server Alarm Soft Reset The Soft Reset command is sent by the NI to reset the IT as well as the accessory ports. This command is intended to reset the IT data structures to their default states.

Hard Reset

The Hard Reset command is sent when the NI wants to fully re-initialize the IT to its power-up default state.

Query Network Manager

The Query command is used to request the status or information from the Network Manager.

| Parameters: | Diagnostic | requests the diagnostic info command to be sent to the NI. |
|---|---|---|
| | Managers | requests the Manager's ID command to be sent to the NI. |
| | Attributes | requests the Attributes Info command to be sent to the NI. |
| | RTCP | requests the RTCP stats to be sent to the NI. |
| | Options | requests the Options status command to be sent to the NI. |
| | Copyright | requests the Copyright report containing a copyright string. |
| | Sanity | requests the IT to reply with a Sanity OK response. This insures that the IT is alive and well. |

Network Manager Options

This command updates the programmable options supported at the IT by the Network Manager.

| Parameters: | Diagnostics | Enables or disables automatic diagnostic data transmission |
|---|---|---|
| | Reliable UDP | Enables or disables reliable UDP layer for control channel |

Control Channel QoS Configuration

This command is used tell the IT which QoS features to make use of when communicating with the NI.

| Parameters: | Type Of Service Enable | Enables ToS field of command |
|---|---|---|
| | ToS | Minimize delay |
| | | Maximize throughput |
| | | Maximize reliability |
| | | Minimize monetary cost |
| | | Normal service |
| | Precedence | Routine |
| | | Priority |
| | | Immediate |
| | | Flash |
| | | Flash override |
| | | Critical |
| | | Internetwork control |
| | | Network control |

Reserve UDP Port Block

The NI uses this command to force the IT to reserve a continuous block UDP ports. Once the ports are successfully reserved the NI can make use of them without fear of interfering with other servers controlling the IT. The command contains the number of ports to reserve and a starting port number. The IT will reply to this command with the Reserved UDP Ports Report stating how many ports were successfully reserved and the starting port number. The NI could use those reserved port numbers to open audio streams for example.

| Parameters: | Number of UDP ports to reserve | Number between 1 and 255 which indicates the number of UDP ports that the NI wants to reserve. |
|---|---|---|
| | Starting UDP port number | Indicates the number of the first UDP port of the block of ports to reserve. When set to 0x00, the IT chooses the starting UDP port. |

Server Identification Tag

This command is used by the NI to download a character string oriented tag which identifies the server. The IT could place this information on the display to identify the active server for the user.

Set RTCP Source Description Items

This command is used by the NI to configure the different source description items that are part of the SDES report of the RTCP protocol.

| Parameters: | Source Description | Name used to describe the IT e.g. "Homer Doe's IT" |
|---|---|---|
| | | E-mail address associated with the IT |
| | | Phone number of the IT |
| | | Geographic location of the IT |
| | | IT software version |
| | | Notice/Status information |

Protocol Switch

The NI sends this command to an IT that supports multiple protocols to force it to change control protocols. The other protocols that the IT supports could have a similar command to enable a switch-back to UNIStim.

| Parameters: | Protocol ID | An identifier for different protocols |
|---|---|---|

Download Backup Server Information

This command is used by the NI to download network-related information regarding backup servers into the IT. Note this command supports the download of info for several backup servers.

| Parameters: | Server ID | Server identifier, used to reference a specific backup server per the following parameters. |
|---|---|---|
| | Server Port Number | Port number an identified server uses for UNIStim channel. |
| | Server IP Address | IP address of the identified server. |

Server Switch

The NI sends this command to force the IT to stop accepting UNIStim commands from the current server and start listening to the server specified in the command. This command assumes that the IT has been made aware of the new server's network address in the configuration process or through the Download Backup Server Information.

| Parameters: | Server ID | Server identifier, used to reference a specific, previously identified server |
|---|---|---|

IT to NI Network Manager Commands
  Soft Reset Ack
  Sanity OK
  Network Manager Attributes info
  Network Manager Diagnostic Info
  Manager IDs
  Network Manager Options Report
  Resume Connection With Server
  Suspend Connection With Server
  Reserved UDP Ports Report
  Copyright Text Soft Reset Ack The Soft Reset Ack command is sent to the NI after the IT has been reset via the reception of the Soft Reset command. The command will be transmitted only after a successful reset has been performed.

Sanity OK

The Sanity OK command is used in response to a Query Sanity command. It indicates that the IT can still receive and transmit from/to the NI.

Network Manager Attributes Info

This command is used in response to the Query Network Manager (Attributes) command generated from the NI. The IT replies by sending the Network Manager Attributes.

| Parameters: | Supported Protocols | List of protocols supported, by protocol identifier |
|---|---|---|

Network Manager Diagnostic Info

The Diagnostic Info command is sent after it has been requested by the Query Network Manager (Diagnostic) command or when an error occurs and the Diagnostic Command transmission has been enabled via the Network Manager Options command.

| Parameters: | RXBUFOVF | Rx Buffer Overflow |
|---|---|---|
| | TXBUFOVF | Tx Buffer Overflow |
| | RXBEMPTY | Rx Buffer Empty |
| | INVALMSG | Invalid Command Received |

Manager IDs

This command is sent from the IT after reception of the Query Network Manager (managers) command from the NI. The IT replies with a list of all managers contained in the IT with the exception of the Network Manager and the Broadcast Manager. A flag, for each manager, indicates if the manager is active or inactive. The format of the command is as follows.

| Parameters: | Managers | List of managers supported by the IT |
|---|---|---|
| | Active | Active/Inactive indication for each manager |

Network Manager Options Report

This command is sent after reception of the Query Network Manager (Options) command. It sends the setup of the options to the NI.

| Parameters: | Diagnostics | Automatic diagnostic data transmission enabled or disabled |
|---|---|---|
| | Reliable UDP | Reliable UDP layer for control channel enabled or disabled |

Copyright Report

This command is used to respond to the Query Network Manager (Copyright) request from the NI. It provides the copyright information as an ASCII string.

Resume Connection With Server

The IT sends this unsolicited command to inform the NI that it is ready to accept commands from NI. The transmission of this command can either be triggered by a power-up or by a user choosing to connect to a new NI after power-up.

Suspend Connection With Server

The IT sends this unsolicited command to inform the NI that it will disconnect itself from the NI. The transmission of this command is normally triggered by a user choosing to connect to a different NI. Typically, this is the last command that the NI will receive from the IT until the user chooses to switch back to the NI.

Reserved UDP Ports Report

This command is sent to inform the NI of the UDP ports that have been reserved as a result of the Reserve UDP Port Block command. The command payload reports the number of UDP ports reserved as well as the number of the first UDP port of the reserved block.

| Parameters: | Number reserved UDP ports | Number between 1 and 255 which indicates the number of UDP ports that are reserved by the IT. A '0' in this field means that the command failed. |
|---|---|---|
| | First UDP Port of block | Indicates the number of the first UDP port of the reserved block. |

Basic Manager

The Basic manager handles the IT maintenance functions.

NI to IT Basic Commands
  Start Selftest
  Query Basic Manager
  Basic Manager Options
  General Read/Write
  EEprom Write
  Encapsulate Command Start Selftest The start selftest command is used for running a selftest in the IT. The self tests are device specific. This message requires that the secure code of the IT be set using the Basic Managers Options (Secure Code) command.

Query Basic Manager

The Query command is sent by the NI. It is used to request the status or information from the Basic manager.

| Parameters: | Attributes | requests the Attributes Info command to be sent |
|---|---|---|
| | Options | requests the Options Status command to be sent |
| | F/W version | requests the F/W version command to be sent |
| | H/W ID | requests the IT H/W ID command to be sent (serial number, color and the release number) |
| | IT Type | requests the IT Type command to be sent |
| | Selftest | requests the Selftest Result command to be sent |
| | PEC | requests the Product Engineering Code command to be sent |

Basic Manager Options

This command updates the programmable options supported by the IT's Basic manager.

| Parameters: | Secure Code | Enables or disables the secure code for critical messages |
|---|---|---|

General Read/Write

This command allows direct read or write access to the devices (EEProm, microprocessor, etc . . . ) of the IT. For the write operation, the SECURE CODE flag must be set through the Basic Manager Options (Secure Code) command. For a read operation, the data bytes must not be present in the command.

| Parameters: | Operation | Read or Write |
|---|---|---|
| | Device | Hardware device identifier |
| | Address | address within the requested device |
| | Data | Data to be written in the case of a Write operation |

EEprom Write

This command allows specific EEprom data byte locations to be written by the NI. In order for this command to succeed, the secure code must be set through the Basic Manager Options (Secure Code) command. This command allows access to EEprom data bytes, without having to know the exact location of the data in the EEprom.

| Parameters: | Element ID | Dynamic EE Chksm |
|---|---|---|
| | | Static EE Chksm |
| | | PEC Index |
| | | Release Number |
| | | Color |
| | | Serial Number |
| | Data | Data bytes to be written to Element ID |

Encapsulate Command

This command enables the NI to use UNIStim to encapsulate commands that belong to UNIStim or other protocols. For example, the NI could force the IT to send out a Key Event command by encapsulating it in the Encapsulate Command. This command could also be used to directly access resources (such as a DSP, VGA screen etc) in the IT without using a UNIStim command.

| Parameters: | Encapsulated Protocol ID | Identifies protocol ID of encapsulated protocol |
|---|---|---|
| | Encapsulated Command | Data corresponding to command in identified protocol |

IT to NI Basic Commands
  Basic Manager Attributes Info
  Basic Manager Options Report
  F/W version
  IT Type
  Selftest result
  General Read Response
  Hardware ID
  Product Engineering Code Basic Manager Attributes Info This command is used in response of the Basic Manager Query (Attributes) command to inform the NI of both the EEPROM static and dynamic checksums. Both values are read directly from the EEPROM.

| Parameters: | Static Checksum | Static Checksum of EEPROM |
|---|---|---|
| | Dynamic Checksum | Dynamic Checksum of EEPROM |

Basic Manager Options Report

This command is sent after reception of the Basic Manager Query (Options) command. It sends the basic manager's options configuration to the NI.

| Parameters: | Secure Code Status | Enabled or Disabled |
|---|---|---|

F/W Version

This command is used in response to the Basic Manager Query (F/W version) command. The F/W version command contains the F/W version code of the IT's code.

| Parameters: | F/W Version | 7 character ASCII string representing the F/W Version |
|---|---|---|

IT Type

The IT Type command is sent in response to the Basic Manager Query (IT Type) command from the NI. It is used to inform the NI on the type of IT.

| Parameters: | IT Type | IT type identifier |
|---|---|---|

Selftest Result

The result of each test performed during a selftest is given by this command. This command is send after reception of the Basic Manager Query (Selftest) command from the NI.

| Parameters: | Test ID | An identifier for each test |
|---|---|---|
| | Test Result | A pass/fail indication for each test identified |

General Read Response

This command is used in response to the General Read/Write command when a read operation is performed.

| Parameters: | Device | Hardware device identifier |
|---|---|---|
| | Address | address within the requested device |
| | Data | Data read from the device. |

Hardware ID

This command is sent in response to the Basic Manager Query (H/W ID) command. It provides the unique number that identifies the IT.

| Parameters: | Serial Number | Unique serial number of the IT |
|---|---|---|
| | Release Number | HW release number of the IT |
| | Colour | Colour code of the IT |

Product Engineering Code

This command is sent in response to the Query Basic Manager (PEC) command from the NI. It provides the Product Engineering Code of the IT.

| Parameters: | PEC | Product Engineering Code for the IT |
|---|---|---|

Key/Indicator Manager

The Key/Indicator Manager is the manager responsible for managing parameters associated with keys and the indicators on the IT.

NI to IT Key/Indicator Commands
    LED Update
    Query Hookswitch
    User Activity Timer
    Downloadable Free Form Icon Access
    Query Key/Indicator Manager
    Key/Indicator Manager Options
    Logical Icon Mapping
    Key Repeat Timer Download
    Query LED State
    Query IT Icon State
    Indicator Cadence Download
    User Activity Timer Download
    Free Form Icon Download
    IT Icon Update LED Update The LED Update command is used to update the state and cadence of LEDs on the IT.

| Parameters | LED ID | LED identifier |
|---|---|---|
| | LED State | Off |
| | | On |
| | | Flash |
| | | Flicker |
| | | Wink |
| | | Twinkle |
| | | Blink |
| | | Downloadable cadence |

Note that cadence should be downloaded using Indicator Cadence Download before selecting Downloadable cadence as the LED State.

Query Hookswitch

The Query Hookswitch command is used to query the state of hookswitch on the IT. The IT must send back the Hookswitch State command in reply.

User Activity Timer

The User Activity Timer can be turned on and off using this command. The time-out value of the timer is defined using the User Activity Timer Download command. When the User Activity timer starts, if no key event happens (depression, repeat or release) in the IT before the timer times-out, the IT will send the User Activity Timer Expired command back to the NI. If at least one key event happens then the timer will reset and start the count down again until the User Activity timer is stopped.

| Parameters: | Start/Stop | Starts or stops the timer |
|---|---|---|

Downloadable Free Form Icon Access

The Downloadable Free Form Icon Access command is used to enable or disable the download Icon RAM bit map. This command allows 'overloading' the existing Free Form Icon ROM bit maps.

| Parameters: | Free Form Icon Source | Hard coded Free Form ROM bit map or downloaded Free Form RAM bit map |
|---|---|---|

Query Key/Indicator Manager

The Query Key/Indicator manager command is used to request information about various states or information handled by the Key/Indicator manager.

| Parameters: | Options | Requests the status of the option setting |
|---|---|---|
| | Attributes | Requests the information of the Key/Indicator manager's Attributes. |

Key/Indicator Manager Options

This NI uses this command to set the Key/Indicator manager options.

| Parameters: | Key Release Message | Enable/Disable the transmission of Key Event message with Key Release flag set when a valid key release occurs |
|---|---|---|
| | Volume Key Message | Enable/Disable the transmission of Volume Key Event messages |
| | Local Dial Pad | No Feedback |

| | | |
|---|---|---|
| | Feedback | Key Click |
| | | DTMF |

Logical Icon Mapping

The Logical Icon Mapping command is used to define the relationship between physical and logical icons in the IT.

| | | |
|---|---|---|
| Parameters: | Command | Global NIL mapping |
| | | One-to-one mapping |
| | | Single mapping |
| | Physical Icon ID | Same as defined in the IT Icon Update command |
| | Logical Icon ID | Logical ID to be assigned to the specified Physical Icon |

Notes:
1) The Global NIL mapping command removes all the mapping between the logical icons and the physical icons.
2) The one-to-one mapping command is used to map the physical icon 0 with the logical icon 0, physical icon 1 with the logical icon 1 and so on.
3) The single mapping command maps a single physical icon to a logical icon ID.
4) The Physical and Logical Icon ID fields are not required when the Administration command is the Global NIL mapping or the one-to-one mapping.

Key Repeat Timer Download

The Key repeat Timer Download is used by the NI to specify the time (first timer) before sending the key repeat command when the key remains depressed and also for specifying the time (second timer) to wait before sending all subsequent key repeat commands if the same key remains depressed.

| | | |
|---|---|---|
| Parameters: | Key Repeat Initial Time | Duration key must be pressed prior to sending key repeat command |
| | Key Auto Repeat Interval | Time interval between successive key repeat commands while key remains depressed |

Notes:
1) The key repeat function may not be supported on all keys

Query LED State

The Query LED State command is used by the NI to extract LED state information from the IT.

| | | |
|---|---|---|
| Parameters: | LED ID | Specifies LED to be queried |

Query IT Icon State

The Query IT Icon State command is used by the NI to extract IT icon state information from the IT.

| | | |
|---|---|---|
| Parameters: | Physical Icon ID | Specifies the physical icon to be queried |

Indicator Cadence Download

The Indicator Cadence Download command is used to specify a new custom cadence that can be used to flash the icons and LEDs when using the downloadable cadence option in the LED Update and IT Icon Update commands.

| | | |
|---|---|---|
| Parameters: | Cycle 1 On Time | On duration for first cycle |
| | Cycle 1 Off Time | Off duration for first cycle |
| | Cycle 2 On Time | On duration for second cycle |
| | Cycle 2 Off Time | Off duration for second cycle |
| | Cycle 3 On Time | On duration for third cycle |
| | Cycle 3 Off Time | Off duration for third cycle |
| | Cycle 4 On Time | On duration for fourth cycle |
| | Cycle 4 Off Time | Off duration for fourth cycle |

Notes:
1) A maximum of four on-off cycles can be specified.
2) Not all four cycles have to be used.

User Activity Timer Download

The User Activity User Download command is used to download the time-out value used by the User Activity timer. This time-out value will be used when the user Activity is started by the User Activity Timer command. Upon receipt of the command the IT will restart the timer with the new time-out value.

| | | |
|---|---|---|
| Parameters: | User Activity Timeout Value | Duration of user activity timeout. |

Free Form Icon Download

This command is used to download a free form icon representation that is not already hard coded in the IT ROM. The command contains the ID of the downloadable icon, and the bitmap that represents the free form icon.

| | | |
|---|---|---|
| Parameters: | Free Form Icon ID | Identifier of downloaded icon |
| | Icon Bitmap Data | Bitmap data of icon representation |

IT Icon Update

This command is used to change the current state and cadence of an IT icon. The IT icon will be updated with the new state and cadence only if the physical icon IS NOT mapped to a logical icon.

| | | |
|---|---|---|
| Parameters: | Physical Icon ID | specifies physical ID of icon to be updated specifies desired state of icon |
| | Icon State | |
| | Icon Cadence | Off |
| | | On |
| | | Flash |
| | | Flicker |
| | | Wink |
| | | Twinkle |
| | | Blink |
| | | Downloadable cadence |

IT to NI Key/Indicator Commands
 Key Event
 LED Status Report
 On hook
 Off hook
 User Activity Timer Expired
 Hookswitch State
 Key/Indicator Manager Attributes info
 Key/Indicator Manager Options Report
 IT Icon Status Report

Key Event

This command is used to report an event related to the keys. The event can be a key depression, key repeat or a key released.

| Parameters: | Key ID | dial pad 0 |
|---|---|---|
| | | dial pad 1 |
| | | dial pad 2 |
| | | dial pad 3 |
| | | dial pad 4 |
| | | dial pad 5 |
| | | dial pad 6 |
| | | dial pad 7 |
| | | dial pad 8 |
| | | dial pad 9 |
| | | dial pad * |
| | | dial pad # |
| | | Navigation Up |
| | | Navigation Down |
| | | Navigation Right |
| | | Navigation Left |
| | | Quit |
| | | Copy |
| | | Volume Up |
| | | Volume Down |
| | | Hold |
| | | Release |
| | | Mute |
| | | Headset |
| | | Handsfree |
| | | Programmable Key 1 to N |
| | Key Event | Key released |
| | | Key depressed |
| | | Key Repeated |

Notes:
1) A number (N) of non specific "programmable" keys are supported

LED Status Report

This command is sent to the NI in response to the Query LED State. It informs the NI on the state and cadence of LEDs.

| Parameters | LED ID | LED identifier |
|---|---|---|
| | LED State | Off |
| | | On |
| | | Flash |
| | | Flicker |
| | | Wink |
| | | Twinkle |
| | | Blink |
| | | Downloadable cadence |

Off Hook

The Off Hook command is sent to the NI when the IT detects an On hook to Off hook transition.

User Activity Timer Expired

This command is sent to the NI when the User Activity timer times out. The actual time-out value for the User Activity Timer is specified by the User Activity Timer Download command.

Hookswitch State

This command is sent to the NI in response to the Query Key/Indicator Manager (Hookswitch) command.

| Parameters: | Hookswitch State | On hook |
|---|---|---|
| | | Off hook |

Key/Indicator Manager Attributes Info

This command is sent to the NI in response to the Query Key/Indicator Manager (Attributes) command and informs it of the attributes of the Key/Indicator manager. The format of the command is as follows.

| Parameters: | Programmable keys | contains the number of programmable keys on the IT |
|---|---|---|
| | Soft Keys | contains the number of soft keys on the IT |
| | Headset Key | indicates existence of a Headset Key on the IT |
| | Mute Key | indicates existence of a Mute Key on the IT |
| | Quit | indicates existence of a Quit Key on the IT |
| | Copy | indicates existence of a Copy Key on the IT |
| | Message Waiting Indicator | indicates existence of a Message Waiting Indicator on the IT |
| | Navigation keys | none |
| | | two |
| | | four |

Key/Indicator Manager Options Report

This command is sent to the NI in response to a Query Key/Indicator Manager (Options) command. It sends the Key/Indicator Manager's options configuration to the NI.

| Parameters: | Key Release Message | Enabled/Disabled |
|---|---|---|
| | Volume Key Message | Enabled/Disabled |
| | Local Dial Pad Feedback | No Feedback |
| | | Key Click |
| | | DTMF |

The options are set via the Key/Indicator Manager Options command.

IT Icon Status Report

This command is used in response of the Query Key/Indicator Manager (Icon State) command. It informs the NI of the state of icons.

| Parameters: | Physical Icon ID | specifies physical ID of icon to be queried |
|---|---|---|
| | Icon State | specifies state of icon |
| | Icon Cadence | Off |
| | | On |
| | | Flash |
| | | Flicker |
| | | Wink |
| | | Twinkle |
| | | Blink |
| | | Downloadable cadence |

Audio Manager

The Audio manager is the entity that manages every aspect of the audio configuration of the IT. The main tasks of the manager are to configure the loss plan and tones, setup voice paths and establish end-to-end voice connections.

NI to IT Audio Commands
    Query Audio Manager
    Query Supervisor Headset Status
    Audio Manager Options
    Mute/unmute
    Transducer Based Tone On
    Transducer Based Tone Off Alerting Tone Configuration
Special Tone Configuration
Paging Tone Configuration
Alerting Tone Cadence Download
Special Tone Cadence Download
Paging Tone Cadence Download
Transducer Based Tone Volume Level
Alerting Tone Test
Visual Transducer Based Tones Enable
Stream Based Tone On
Stream Based Tone Off
Stream Based Tone Configuration
Stream Based Tone Frequency Component List Download
Stream Based Tone Cadence Download
Select Adjustable Rx Volume
Set APB's Rx Volume Levels
Change Adjustable Rx Volume
Adjust Default Rx Volume
Adjust APB's Tx and/or STMR Volume Level
Query APB's Tx and/or STMR Volume Level
ABP Download
Open Audio Stream
Close Audio Stream
Connect Transducer
Frequency Response Specification
Biquad Download
Voice Switching Configuration
Query RTCP Statistics
Vocoder Configuration
Jitter Buffer Configuration Query Audio Manager
    The Query Audio Manager command is used to request various status or information from the Audio manager.

| Parameters: | Attributes | requests the Attributes of the Audio manager |
| --- | --- | --- |
| | Options | request the option setting of the Audio manager |
| | Alerting | requests the Alerting selection (warbler rate and cadence) |
| | Adjustable Rx Volume | requests the IT to send the Adjustable Rx Volume Information command. |
| | APB Default Rx Volume | requests the IT to send the Default Rx Volume of the specified APB |
| | Handset | requests the handset status |
| | Headset | requests the headset status |
| | APB number | specifies the APB for the APB Default Rx Volume query |

Query Supervisor Headset Status
    This command is used to query the connection status of the supervisor headset.

Audio Manager Options
    This command updates the programmable options supported by the Audio manager.

| Parameters: | Volume Adjustment | Remote: volume adjusted by the NI |
| --- | --- | --- |
| | | Local: volume adjusted by IT |
| | Volume Adjustment Reports | Enable/Disable the transmission of volume adjustment reports when volume keys are depressed |
| | Headset Rfeature Key Message | Enable/Disable the transmission of Headset Rfeature Key message when key event is detected on headset interface. |

Mute/Unmute
    This command is used to mute/unmute Rx and Tx streams.

| Parameters | Stream ID | Identifies stream to mute/unmute |
| --- | --- | --- |
| | Direction | Rx |
| | | Tx |
| | Mute Function | Mute |
| | | Unmute |

Notes:
1) A single command can be used to change the mute setting of many streams at once by replicating the parameters of the command as many times as required.

Transducer Based Tone On
    This command is used to turn on one of the transducer based tone (alerter, paging or special tone ). The association between a transducer based tone and a transducer is done using the Alerter Tone Setup, Paging Tone Setup and Special Tone Setup commands of the audio manager. Some of these tones may be mutually exclusive.

| Parameters: | Transducer based Tone ID | Alerting |
| --- | --- | --- |
| | | Special Tones |
| | | Paging Tones |
| | Attenuation | Downloaded tone volume level |
| | | Downloaded tone volume level - 2 |

Transducer Based Tone Off
    This command is used disconnect a transducer based tone from its associated transducer.

| Parameters: | Transducer Based Tone ID | Alerting |
| --- | --- | --- |
| | | Special Tones |
| | | Paging Tones |

Alerting Tone Configuration
    This command is used to configure the various parameters that are associated with the Alerting tone. Through this command the alerter tone's volume range, warbler effect, cadence and transducer routing can be configured.

| Parameters: | Warble Select | Specifies the warble to use with the alerting tone |
| --- | --- | --- |
| | Tone Volume Range | Number of steps from the maximum tone volume value, which is set by hardware. |
| | Transducer Routing | Handset Speaker |
| | | Headset Speaker |
| | | Handsfree Speaker |
| | Cadence Select | cadence 0 |
| | | cadence 1 |
| | | cadence 2 |
| | | cadence 3 |
| | | cadence 4 |
| | | cadence 5 |
| | | cadence 6 |
| | | downloadable alerter tone cadence |

Special Tone Configuration
    This command is used to configure the various parameters that are associated with the special tone. Through this command the special tone's volume range, cadence and transducer routing can be configured.

| Parameters: | Tone Volume Range | Number of steps from the maximum tone volume value, which is set by hardware. |
| --- | --- | --- |
| | Transducer Routing | Transducer to which the special tone will be routed when turned on. Handset speaker Headset speaker Handsfree speaker |
| | Cadence Select | cadence 0 cadence 1 cadence 2 cadence 3 cadence 4 cadence 5 cadence 6 downloadable special tone cadence |
| | Special Tone Content | Selects the frequencies that make up the special tone |

Paging Tone Configuration

This command is used to configure the various parameters that are associated with the paging tone. Through this command the paging tone's volume range, cadence and transducer routing can be configured.

| Parameters: | Tone Volume Range | Number of steps from the maximum tone volume value, which is set by hardware. |
| --- | --- | --- |
| | Transducer Routing | Transducer to which the special tone will be routed when turned on. Handset speaker Headset speaker Handsfree speaker |
| | Cadence Select | cadence 0 cadence 1 cadence 2 cadence 3 cadence 4 cadence 5 cadence 6 downloadable paging tone cadence |

Alerting Tone Cadence Download

The Alerting Cadence Download command is used by the NI to download an alerting cadence in the IT. This new Alerting Tone cadence will be used the next time the IT receives the Tone On (Alerting Tone) command if this tone is set to use the downloadable cadence (see Tone Cadence Select command).

| Parameters: | Cycle 1 On Time | On duration for first cycle |
| --- | --- | --- |
| | Cycle 1 Off Time | Off duration for first cycle |
| | Cycle 2 On Time | On duration for second cycle |
| | Cycle 2 Off Time | Off duration for second cycle |
| | Cycle 3 On Time | On duration for third cycle |
| | Cycle 3 Off Time | Off duration for third cycle |
| | Cycle 4 On Time | On duration for fourth cycle |
| | Cycle 4 Off Time | Off duration for fourth cycle |

Notes:
1) A maximum of four on-off cycles can be specified.
2) Not all four cycles have to be used.

Special Tone Cadence Download

The Special Tone Cadence Download command is used to download a Special Tone cadence in the IT. This new Special Tone cadence will be used the next time the IT receives the Tone On (Special Tone) command if this tone is set to use the downloadable cadence (see Tone Cadence Select command).

| Parameters: | Cycle 1 On Time | On duration for first cycle |
| --- | --- | --- |
| | Cycle 1 Off Time | Off duration for first cycle |
| | Cycle 2 On Time | On duration for second cycle |
| | Cycle 2 Off Time | Off duration for second cycle |

Notes:
1) A maximum of two on-off cycles can be specified.
2) Not all two cycles have to be used.

Paging Tone Cadence Download

The Paging Tone Cadence Download command is used to download the configuration for the paging tone. The command is used to specify the tone frequency and On/Off duration of all the tones that make up the paging tone. This new Paging Tone cadence will be used the next time the IT receives the Tone On (Paging Tone) command if this tone is set to use the downloadable cadence (see Tone Cadence Select command).

| Parameters: | Cycle 1 Paging Tone Content | Specifies the tone frequecies to be used in the first cycle |
| --- | --- | --- |
| | Cycle 1 On Time | On duration for first cycle |
| | Cycle 1 Off Time | Off duration for first cycle |
| | Cycle 2 Paging Tone Content | Specifies the tone frequecies to be used in the second cycle |
| | Cycle 2 On Time | On duration for second cycle |
| | Cycle 2 Off Time | Off duration for second cycle |
| | Cycle 3 Paging Tone Content | Specifies the tone frequecies to be used in the third cycle |
| | Cycle 3 On Time | On duration for third cycle |
| | Cycle 3 Off Time | Off duration for third cycle |

Notes:
1) A maximum of three paging tone cycles can be specified.
2) Not all three cycles have to be used.
3) The paging tone frequency content is specified for each cycle

Transducer Based Tone Volume Level

The Transducer Based Tone Volume Level command is used to specify the volume level for different transducer based tones. The volume is defined in steps from the lowest level of the volume range. If the volume level specified in the command is outside the volume range, the upper boundary of the range will be used as the new volume level.

| Parameters: | Transducer Based Tone ID | Alerting |
| --- | --- | --- |
| | | Special Tones |
| | | Paging Tones |
| | Tone Volume | Specifies tone volume from lowest level of volume range |

Alerting Tone Test

The Alerting Tone Test command is used to start the alerting tone on the IT without changing the current selection of alerting. This command is usually used when the user selects the type of alerting. Only the warbler can be selected.

| Parameters: | Warble Select | Specifies the warble to use with the alerting tone |
| --- | --- | --- |

Visual Transducer Based Tones Enable

This command is used to configure the IT with respect to providing visual tones feedback when it receives the Transducer Based Tone On command.

| Parameters: | Visual Tones | Enable/Disable Visual Tones |
| --- | --- | --- |

Stream Based Tone On

This command is used to inject a stream based tone into an audio stream. The actual parameters that define the stream based tone specified in the command can be set using the Stream Based Tone Configuration command which is used to bind a cadence and a frequency component list with the tone.

| Parameters: | Stream Based Tone ID | Identifies the stream based tone to be injected in audio stream |
| --- | --- | --- |
| | Stream ID | Identifies the stream in which to inject the stream based tone |
| | Direction | Rx |
| | | Tx |
| | Tone Level | Volume level at which the tone should be played out, in steps from minimum. |

Stream Based Tone Off

This command to stop the injection of the specified stream based tone in the specified audio stream.

| Parameters: | Stream Based Tone ID | Identifies the stream based tone to be stopped in audio stream |
| --- | --- | --- |
| | Stream ID | Identifies the stream in which to inject the stream based tone should be stopped |
| | Direction | Rx |
| | | Tx |

Stream Based Tone Configuration

This command is used to bind one of the 32 stream based tone cadences and one of the 32 frequency component lists with a stream based tone. The next time the stream based tone referred to in the command is turned on through the Stream Based Tone On command, it will use the cadence and frequency component list specified in this command. The actual cadences and frequency component lists can be modified through the Stream Based Tone Cadence Download and the Stream Based Tone Frequency Component List Download.

| Parameters: | Stream based Tone ID | Stream based tone to bind with cadence in frequency component list specified in the command. |
| --- | --- | --- |
| | Stream based Tone Cadence ID | Cadence to use next time stream based tone specified in command is turned on. |
| | Stream based Tone Frequency Component List | Frequency components to use next time stream based tone specified in command is turned on. |

Stream Based Tone Frequency Component List Download

This command is used to reconfigure one of the 32 frequency component lists available for stream based tones.

| Parameters: | Frequency Component 1 | Specifies the frequency of the first component |
| --- | --- | --- |
| | Frequency Component 2 | Specifies the frequency of the second component |
| | Frequency Component 3 | Specifies the frequency of the third component |
| | Frequency Component 4 | Specifies the frequency of the fourth component |

Notes:
1) A maximum of four frequency components can be specified.
2) Not all four components have to be used.

Stream Based Tone Cadence Download

This command is used to reconfigure one of the 32 cadences available for stream based tones. The command specifies up to four On/Off duration pairs.

| Parameters: | Stream based Tone Cadence ID | Cadence to use next time stream based tone specified in command is turned on. |
| --- | --- | --- |
| | Cycle 1 On Time | On duration for first cycle |
| | Cycle 1 Off Time | Off duration for first cycle |
| | Cycle 2 On Time | On duration for second cycle |
| | Cycle 2 Off Time | Off duration for second cycle |
| | Cycle 3 On Time | On duration for third cycle |
| | Cycle 3 Off Time | Off duration for third cycle |
| | Cycle 4 On Time | On duration for fourth cycle |
| | Cycle 4 Off Time | Off duration for fourth cycle |

Notes:
1) A maximum of four cycles can be specified.
2) Not all four components have to be used.
3) If the off time of cycle 1 is not specified, the stream based tone will be played until it is turned off through the Stream Based Tone Off command.

Select Adjustable Rx Volume

This command is used to select the Rx volume that will be affected by the Change Adjustable Rx Volume command.

| Parameters: | Adjustable Rx Volume | none |
|---|---|---|
| | | Audio Parameters Bank 1 |
| | | Audio Parameters Bank 2 |
| | | Audio Parameters Bank 3 |
| | | Audio Parameters Bank 4 |
| | | Audio Parameters Bank 5 |
| | | Audio Parameters Bank 6 |
| | | Audio Parameters Bank 7 |
| | | Alerting |
| | | Special Tones |
| | | Paging Tones |

Set APB's Rx Volume Levels

The Set APB's Rx Volume Level command is used to specify the new Current Rx Volume for the specified APB. The command can also force the Default Rx Volume to be changed to the specified Current Rx Volume by setting the Default flag. The volume level is specified as an offset in number of steps from the system RLR for the path specified APB. This command will override volume control adjustments done by the user. This command is intended to be used by the system to convey volume control adjustments made by the user in list based option controls.

| Parameters: | APB number | none |
|---|---|---|
| | | Audio Parameters Bank 1 |
| | | Audio Parameters Bank 2 |
| | | Audio Parameters Bank 3 |
| | | Audio Parameters Bank 4 |
| | | Audio Parameters Bank 5 |
| | | Audio Parameters Bank 6 |
| | | Audio Parameters Bank 7 |
| | RLR Offset Direction | Indicates whether the offset is a positive or a negative offset with respect to the APB's system RLR. |
| | Update Default | Specifies whether the default volume for the APB should be updated |
| | Rx Volume Level Offset | Specifies the volume offset in steps to be applied to the APB's system RLR. |

Change Adjustable Rx Volume

This command is used to increase or the decrease the receive volume selected through the Select Adjustable Rx Volume command by one step within the limits of its loss plan. This command is used when the volume adjustments are performed by the NI instead of locally in the IT.

| Parameters: | Down | One step quieter |
|---|---|---|
| | Up | One step louder |

Adjust Default Rx Volume

This command is used to increase or decrease the Default Rx Volume value of the specified Audio Parameters Bank (APB) or transducer based tone by one step within the limits of its loss plan. This command should be used when the user increases or decreases the default Rx volume from an option list. Also notice that this command will only change the default Rx volume and not the system default value which is the RLR (downloaded via the Receive Loudness Rating command) so the loss plan will not be changed with this command.

| Where | Down | One step quieter |
|---|---|---|
| | Up | One step louder |
| | Default Rx Volume to Change | none |
| | | Audio Parameters Bank 1 |
| | | Audio Parameters Bank 2 |
| | | Audio Parameters Bank 3 |
| | | Audio Parameters Bank 4 |
| | | Audio Parameters Bank 5 |
| | | Audio Parameters Bank 6 |
| | | Audio Parameters Bank 7 |
| | | Alerting |
| | | Special Tones |
| | | Paging Tones |

Adjust APB's Tx and/or STMR Volume Level

The Adjust APB's Tx and/or STMR command is sent by the NI to allow Tx and STMR volume adjustments for different transducer types. It is used to adjust the APB's Tx or STMR volume level, either increasing or decreasing it by one step. The adjustment enable bits allow the NI to adjust both Tx and STMR volumes with a single command. Alternatively, either the STMR or Tx volumes can be adjusted individually. This command is intended to be used for multi-vendor headset configuration.

| Parameter | APB number | none |
|---|---|---|
| | | Audio Parameters Bank 1 |
| | | Audio Parameters Bank 2 |
| | | Audio Parameters Bank 3 |
| | | Audio Parameters Bank 4 |
| | | Audio Parameters Bank 5 |
| | | Audio Parameters Bank 6 |
| | | Audio Parameters Bank 7 |
| | STMR Volume Increment Direction | STMR volume increase/decrease by one increment |
| | STMR Volume Adjust Enable | Enables/Disables volume adjustments to be made to the STMR path |
| | Tx Volume Increment Direction | Tx volume increase/decrease by one increment |
| | Tx Volume Adjust. Enable | Enables/Disables adjustments to be made to the Tx path |

Query APB's Tx and/or STMR Volume Level

The Query APB's Tx and/or STMR command is sent by the NI to query the current STMR and/or Tx volume level settings. This command is intended to be used for multi-vendor headset configuration.

| Parameters: | APB number | none |
|---|---|---|
| | | Audio Parameters Bank 1 |
| | | Audio Parameters Bank 2 |
| | | Audio Parameters Bank 3 |
| | | Audio Parameters Bank 4 |
| | | Audio Parameters Bank 5 |
| | | Audio Parameters Bank 6 |
| | | Audio Parameters Bank 7 |
| | STMR Volume Level Request | requests STMR volume level information from audio manager |
| | Tx Volume Level Request | requests Tx volume level information from audio manager |

ABP Download

This command is used to download all the audio parameters (such as loss plan) associated with a specific audio parameter bank. The new parameters will be used the next time a voice call involving the ABP is set up. This command uses flags to indicate the presence (or absence) of each audio parameter.

| Parameters: | APB number | Audio Parameters Bank 1 |
| --- | --- | --- |
| | | Audio Parameters Bank 2 |
| | | Audio Parameters Bank 3 |
| | | Audio Parameters Bank 4 |
| | | Audio Parameters Bank 5 |
| | | Audio Parameters Bank 6 |
| | | Audio Parameters Bank 7 |
| | Switched Loss | Amount of Switched Loss used by the Switching algorithm |
| | Step Size | The volume step size |
| | Minimum Volume | Minimum Volume relative to the RLR |
| | Automatic Gain Control | Specifies if AGC is implemented for this APB. |
| | Maximum Volume | Maximum Volume Relative to the RLR |
| | Receive Loudness Rating | The RLR to use for this APB |
| | Return to Default | Specifies if the volume control for this APB is to operation in return to default mode |
| | Send Loudness Rating | The SLR to use for this APB |
| | SideTone Masking Rating | The STMR to use for this APB |

Open Audio Stream

This command is used to set up full or half-duplex end-to-end RTP voice sessions between the IT and an IP connected far-end. This command is also used to specify RTCP ports and DTMF support for the specified voice session.

| Parameters: | Rx Stream ID | Tells the IT which stream it must use as the destination of voice data originating from the far end. |
| --- | --- | --- |
| | Tx Stream ID | Tells the IT which stream it must use as the source of voice data destined to the far-end. |
| | Rx Vocoder Type | Specifies to type of vocoder to use to decode the Rx Stream. |
| | Tx Vocoder Type | Specifies to type of vocoder to use to encode the Tx Stream. |
| | Frames per Packet | Specifies how many audio frames are contained in a single UDP packet |
| | ToS | Minimize delay |
| | | Maximize throughput |
| | | Maximize reliability |
| | | Minimize monetary cost |
| | | Normal service |
| | Precedence | Routine |
| | | Priority |
| | | Immediate |
| | | Flash |
| | | Flash override |
| | | Critical |
| | | Internetwork control |
| | | Network control |
| | Tx DTMF | This bit is used to indicate whether or not DTMF key pressed information will be transmitted as part of the voice session. |
| | Rx DTMF | This bit is used to indicate whether or not DTMF key pressed information will be recieved as part of the voice session. |
| | IT RTP Port | Local UDP port to use for transmitting and receiving voice data. |
| | IT RTCP Port | Local UDP port to use for transmitting and receiving RTCP control messages. An RTCP port of "zero" means that the audio stream does not have an RTCP channel and that the Far-End RTCP port field is a "don't care". |
| | Far-End RTP Port | Far-end UDP port to/from which the voice data should be sent/received. |
| | Far-End RTCP Port | Far-end UDP port to/from which the RTCP control messages should be sent/received. |
| | Far-End IP Address | Specifies the IP address of the end point that is at the other end of the RTP connection. |

Close Audio Stream

This command is used to kill audio voice sessions associated with the stream Ids specified in the payload of the command.

| Parameters: | Rx Stream ID | Tells the IT which Rx stream it must terminate |
| --- | --- | --- |
| | Tx Stream ID | Tells the IT which Tx stream it must terminate |

Connect Transducer

This command is used to cross-connect the transducers specified in the command with a quantity of streams in an uni-directional or bi-directional fashion. The actual streams referred to in this command are created through the Open Audio Stream command. This command can also be used to assign an Audio Parameters Bank (APB) to the transducer pair designated in the command.

| Parameters | Transducer Pair ID | Handset |
| --- | --- | --- |
| | | Headset |
| | | Handsfree Speaker/Microphone |
| | | All Transducer Pairs |
| | Stream ID | ID of the stream to connect to the transducer specified in the command. |
| | Tx Enable | Streams specified in the command are connected the microphone of the designated transducer pair. |
| | Rx Enable | Streams specified in the command are connected the speaker of the designated transducer pair. |
| | APB | Specifies if an APB is to be used in conjuction with the specified transducer pair |
| | Sidetone | Specifies if sidetone is enabled for transducer pair specified in command |
| | Destructive/Additive | Specifies whether this command should augment or replace transducers that were connected to the streams listed in the command prior to its reception. |
| | APB number | none |
| | | Audio Parameters Bank 1 |
| | | Audio Parameters Bank 2 |
| | | Audio Parameters Bank 3 |
| | | Audio Parameters Bank 4 |
| | | Audio Parameters Bank 5 |
| | | Audio Parameters Bank 6 |
| | | Audio Parameters Bank 7 |

Frequency Response Specification

The Frequency Response Specification command specifies the filter building blocks to be used to implement the desired frequency response for a given transducer. The command is used by the IT to fill in a frequency response specification table, specifying which filters need to be set up for a given transducer. The Frequency Response Specification command contains a list of filter numbers which correspond to predefined filter building blocks in the IT. Each filter ID will program a predefined number of biquadratic sections (biquads). The biquad ID field specifies the first biquad to be used for implementing the filter. The Filter Gain Compensation is sent as part of the Frequency Response Specification. The Filter Gain Compensation specifies a gain adjustment to compensate for any deviation from the Loudness Rating (LR) caused by the filter shape specified by the frequency response specification. Both the Rx and Tx FGC values must be provided each and every time this command is sent.

| Parameters: | Transducer ID | Handset |
| --- | --- | --- |
| | | Headset |
| | | Handsfree Speaker/Microphone |
| | Rx Filter Count | number of new filter in the Rx direction |
| | Tx Filter Count | number of new filter in the Tx |
| | Starting BQ ID | ID of the first biquad to use for implementing the filter. |
| | Rx/Tx Filter ID | Filter Id as specified in the functional description. |

Notes:
1) The number of Rx and Tx Filter ID bytes must match the filter count provided in the first data byte.
2) Each filter occupies a certain number of biquads. The NI should know exactly the number of biquads each filter occupies in order to fill up the biquads in the IT correctly.

Biquad Download

The Biquad Download command is used to adjust the IT frequency response by downloading new set of coefficients for a specific biquad. The next time the IT will program the biquads, it will use the new set of coefficients. The downloaded biquad can be selected using the Frequency Response Specification command. Each biquad takes five coefficients, B0, B1, B2, A1 and A2.

| | Biquad ID | Biquad Identifier |
| --- | --- | --- |
| Parameters: | B0 | Coefficient B0 |
| | B1 | Coefficient B1 |
| | B2 | Coefficient B2 |
| | A1 | Coefficient A1 |
| | A2 | Coefficient A2 |

Voice Switching Configuration

This command is used to download the voice switching parameters associated with a specific transducer. These parameters will be used the next time the voice switching is enabled.

Note that unlike the Connect Transducer command, there is no need for the Transducer Direction bit since the command specifies frequency responses for both the receive and transmit transducers. For each receive transducer specified in the Tranducer ID field, the command will also be used to configure its transmit-side counterpart.

| Parameters: | Transducer ID | Handset |
| --- | --- | --- |
| | | Headset |
| | | Handsfree Speaker/Microphone |

-continued

| | AGC Threshold | Input threshold for application of AGC |
| --- | --- | --- |
| | Rx Virtual Pad | Tx blocking margin of the switching algorithm |
| | Dialtone threshold | Input threshold for considering a dialtone |
| | Tx Virtual Pad | Rx blocking margin of the switching algorithm |
| | Echo Mute Enable | Enable/Disable talker echo muting |
| | Dynamic Sidetone Enable | Enable/Disable sidetone variation based on noise floor |

Query RTCP Statistics

This command is used by the NI to request RTCP data gathered in the media session associated with the stream ID specified.

| Parameters: | Stream ID | ID of the stream to be queried |
| --- | --- | --- |
| | Stream Direction | Rx |
| | | Tx |
| | IT Packet Count | Requests the total number of packets sent by the IT in the session up to this point |
| | IT Octet Count | Requests the total number of octets sent by the IT in the session up to this point |
| | Interarrival Jitter | Requests an estimate of the statistical variance of the delay between each received media packets |
| | Fraction Lost | Requests the fraction of media packets lost as reported in the last RTCP packet |
| | Total Packet Loss | Requests the total number of lost packets since the beginning of the media session |

Vocoder Configuration

This command is used to configure parameters that are associated with the vocoder specified in the command. The command contains a field that identifies the vocoder to modify followed by a list of new parameter settings. Note that not all vocoders support the entire list configurable parameters.

| Parameters: | Vocoder Type | Specifies the vocoder on which to apply the parameter settings |
| --- | --- | --- |
| | Direction | Rx |
| | | Tx |
| | | Both |
| | Voice Activity Detection | Enable/Disable |
| | Bad Frame Interpolation Algorithm | Enable/Disable |
| | Post Filter | Enable/Disable |
| | High Pass Filter | Enable/Disable |
| | Frame Size | Specifies number of bytes per frame |

Jitter Buffer Configuration

This command is used to configure parameters that are associated with the jitter buffer of the specified stream.

| Parameters: | Stream ID | ID of the stream to associated with the jitter buffer to be configured. |
| --- | --- | --- |
| | Jitter Buffer | Maximum number of frames in jitter |

| | |
|---|---|
| Maximum Size | buffer beyond which uncontrolled frame loss will occur. |
| Desired Jitter | Desired number of frames in jitter buffer. When controlled frame deletion occurs, enough frames will be deleted to reach this number. |
| High Water Mark | Threshold number of frames in jitter buffer at which point controlled frame deletion will occur. |

IT to NI Audio Commands
   Handset connected
   Handset disconnected
   Headset connected
   Headset disconnected
   Supervisor Headset connected
   Supervisor Headset disconnected
   Headset Rfeature Key Pressed
   Audio Manager Attributes info
   Audio Manager Options Report
   Adjustable Rx Volume Report
   Adjustable Rx Volume Information
   APB's Default Rx Volume Value
   Alerting Tone Select
   APB's Tx and/or STMR Response
   RTCP Statistics Report
   Open Audio Stream Report Handset Connected The Handset Connected command is sent to the NI when a handset is detected in the handset port of the IT.

| Parameters: | Handset Type | Specifies the type of handset detected |
|---|---|---|

Handset Disconnected

The Handset Disconnected command is sent to the NI when the handset is disconnected from the handset port of the IT.

Headset Connected

The Headset Connected command, is sent to the NI when a headset is detected in the headset port of a so equipped IT Headset Disconnected The Headset Disconnected command is sent to the NI when the headset is disconnected from the headset port.

Supervisor Headset Connected

The Supervisor Headset Connected command is sent to the NI when the supervisor headset is detected on the supervisor headset port of a so equipped IT.

Supervisor Headset Disconnected

The Supervisor Headset Disconnected command is sent to the NI when the supervisor headset is disconnected from the supervisor headset port.

Headset Rfeature Key Pressed

The Headset Rfeature Key Pressed command is sent to the NI in response to the IT receiving the predefined headset based feature key event on the headset port. The transmission of this message is enabled by the Audio Manager Options (Headset Rfeature Key Message) command.

Audio Manager Attributes Info

This command is used in response of the Query Attributes command to inform the NI of all the attributes that the Audio manager has.

| Parameters: | Handsfree | Handsfree supported |
|---|---|---|
| | Supported Vocoders | List of all vocoders supported by the IT. |

Audio Manager Options Report

This command is sent after reception of the Audio Manager Query (Options) command. It informs the NI of the Audio manager's option setup.

| Parameters: | Volume Adjustment | Remote: volume adjusted by the NI Local: volume adjusted by IT |
|---|---|---|
| | Volume Adjustment Reports | Enable/Disable the transmission of volume adjustment reports when volume keys are depressed |
| | Headset Rfeature Key Message | Enable/Disable the transmission of Headset Rfeature Key message when key event is detected on headset interface. |

Adjustable Rx Volume Report

This command is sent to the NI after a volume key has been depressed and the "Volume Adjustment Reports" option has been enabled via the Audio Manager Options command. The command shows which volume key has been depressed and if it caused the rx volume reach its "floor" or "ceiling". The NI could use this information to display a visual representation of the volume adjustment to the user.

| Parameters: | Volume ID | none |
|---|---|---|
| | | Audio Parameters Bank 1 |
| | | Audio Parameters Bank 2 |
| | | Audio Parameters Bank 3 |
| | | Audio Parameters Bank 4 |
| | | Audio Parameters Bank 5 |
| | | Audio Parameters Bank 6 |
| | | Audio Parameters Bank 7 |
| | | Alerting |
| | | Special Tones |
| | | Paging Tones |
| | | Steam Based Tones |
| | Vol. Down | Indicates that the volume down key has been depressed. |
| | Vol. Up | Indicates that the volume up key has been depressed. |
| | Floor | Indicates that the volume setting of the specified .volume register has decreased to the "floor" |
| | Ceiling | Indicates that the volume setting of the specified .volume register has increased to the "ceiling" |

Adjustable Rx Volume Information

This command is used to inform the NI of the active Rx volume register in the IT. It contains the APB or transducer based tone number, its current Rx volume setting and volume range as well as the floor ceiling indications. This command is sent generally after reception of the Query Audio Manager (Adjustable Rx Volume) command

| Parameters: | Active Volume ID | none |
| --- | --- | --- |
| | | Audio Parameters Bank 1 |
| | | Audio Parameters Bank 2 |
| | | Audio Parameters Bank 3 |
| | | Audio Parameters Bank 4 |
| | | Audio Parameters Bank 5 |
| | | Audio Parameters Bank 6 |
| | | Audio Parameters Bank 7 |
| | | Alerting |
| | | Special Tones |
| | | Paging Tones |
| | | Stream Based Tones |
| | Floor | Indicates that the volume setting of the specified .volume register is at its "floor". |
| | Ceiling | Indicates that the volume setting of the specified .volume register is at its "ceiling". |
| | Rx Volume Level | Current setting of the specified volume register. |
| | Rx Volume Range | Range of the specified volume register. |

APB Default Rx Volume Value

The Audio Parameters Bank Default Rx Volume Value command is used in response to the Query Audio Manager (APB Default Rx Volume) command. It gives the default Rx volume level of the specified APB. It contains the APB number, the default volume setting of the APB, the floor ceiling indicators.

| Parameters: | APB Identifier | none |
| --- | --- | --- |
| | | Audio Parameters Bank 1 |
| | | Audio Parameters Bank 2 |
| | | Audio Parameters Bank 3 |
| | | Audio Parameters Bank 4 |
| | | Audio Parameters Bank 5 |
| | | Audio Parameters Bank 6 |
| | | Audio Parameters Bank 7 |
| | | Alerting |
| | | Special Tones |
| | | Paging Tones |
| | | Stream Based Tones |
| | Floor | Indicates that the volume setting of the specified .volume register is at its "floor". |
| | Ceiling | Indicates that the volume setting of the specified .volume register is at its "ceiling". |
| | Default Volume Level | Default volume of the specified volume register. |
| | Volume Range | Range of the specified volume register. |

Alerting Tone Select

This command is used in response to the Query Audio Manager (Alerting) command. The alerting information as well as the warble rate selection are sent as part of this command. The format of the command as follows.

| Parameters: | Alerting Cadence Selection | cadence 0 |
| --- | --- | --- |
| | | cadence 1 |
| | | cadence 2 |
| | | cadence 3 |
| | | cadence 4 |
| | | cadence 5 |
| | | cadence 6 |
| | | downloadable cadence |
| | Warbler Select | Specifies warble selected |

APB's Tx and/or STMR Response

The Query APB's Tx and/or STMR response is sent by the IT in response to the corresponding query command. The response sent by the IT indicates the current STMR and/or Tx volume level setting for the specified APB number.

| Parameters: | APB number | none |
| --- | --- | --- |
| | | Audio Parameters Bank 1 |
| | | Audio Parameters Bank 2 |
| | | Audio Parameters Bank 3 |
| | | Audio Parameters Bank 4 |
| | | Audio Parameters Bank 5 |
| | | Audio Parameters Bank 6 |
| | | Audio Parameters Bank 7 |
| | Tx Vol Level | current Tx volume level for the specified APB |
| | STMR Vol. Level | current STMR volume level for the specified APB |

RTCP Statistics Report

This command is sent in response to the Query RTCP Statistics command sent by the NI.

| Parameters: | IT Packet Count | Total number of packets sent by the IT in the session up to this point. |
| --- | --- | --- |
| | IT Octet Count | Total number of octets sent by the IT in the session up to this point. |
| | Interarrival Jitter | Estimate of the statistical variance of the delay between each received media packet. |
| | Fraction Lost | Fraction of media packets lost as reported in the last RTCP packet. |
| | Total Packet Lost | Total number of lost packets since the beginning of the media session. |

Open Audio Stream Report

The IT automatically sends this command to the NI after it receives an Open Audio Stream command. The command reports on the status of the stream created by the Open Audio Stream command.

| Parameters: | Status Code | Stream opened successfully |
| --- | --- | --- |
| | | Operation failed - RTP port not available |
| | | Operation failed - RTCP port not available |

Display Manager

The main task of the display manager is to present the information sent by the NI on the LCD. The NI does not have to know the physical location of where the information is presented. Another big task of the display manager is to maintain the configuration tables for the multi-language character tables.

NI to IT Display Commands
    Page Scroll
    Restore Default Character Table Configuration
    Display Backlight Control
    Arrow
    Query Status Bar Icon
    Highlight On/Off
    Restore Time and Date
    Clear Time and Date
    Call Duration Timer
    Query Display Manager Download Call Duration Timer Delay
Disable Display Field
Clear Field
Cursor Control
Page Download
Display Scroll with Data
Status Bar Icon Update
Month Label Download
Call Timer Label Download
Time and Date Format
Display Data Write
Context Info Bar Format
Set Default Character Table Configuration
Set Current Character Table Configuration
Special Character Download
Highlighted Field Definition
Contrast
Caller Log Download Page Scroll This command is used to scroll up or down one page of display. This command assumes that the information of the page to scroll to is already downloaded in the IT.

Restore Default Character Table Configuration

This command is used to restore the character table configuration of the display to the one downloaded through the Set Default Character Table Configuration command. The G1, G2 and G3 tables will contain the character sets specified by the default configuration and one of the G table will be lock-shifted (code A0 to FF hex).

Display Backlight Control

This command is used to turn on and off the display backlight. This could be used in power saving mode when back lighting is supported by the IT.

| Parameters: | Backlight | Turn Backlight on or off |
|---|---|---|

Arrow

This command turns on or off the dedicated arrow fields on the display.

| Parameters: | Left | Turn Left arrow on or off |
|---|---|---|
| | Right | Turn Right arrow on or off |
| | Up | Turn Up arrow on or off |
| | Down | Turn Down arrow on or off |

Query Status Bar Icon

This command is used to query the state of a specific icon in the status bar. The IT will reply with the Status Bar Icon State command specifying the state of the queried icon.

| Parameters: | Status Bar Icon ID | Specifies the status bar icon to be queried |
|---|---|---|

Highlight On/Off

This command is used to turn on or off the highlight on the display. When the highlight is turned on, the field that is specified by the Highlighted Field Definition command will be highlighted.

| Parameters: | Highlight | Turn Highlight on or off |
|---|---|---|

Restore Time and Date

This command is used to revert the effect of the Clear Time and Date and Caller Log Download commands by restoring the time and date in the time & date fields of the IT. The time and date or the call duration information, whichever was the last one active prior to receipt of a Clear Time and Date command or the Caller Log Download command, will be shown in the time and date field.

Clear Time and Date

This command clears the time and date fields and inhibits the update of the fields with the time and date information. The time and date information is still kept in the IT in case it is restored with a Restore Time & Date command.

Call Duration Timer

This command is used to configure the call duration timer. Through this command, the call duration timer can be started or stopped, reset, shown or hidden, with or without a delay.

| Parameters: | Function | Start |
|---|---|---|
| | | Stop |
| | Reset | Resets the Timer |
| | Display | Show |
| | | Hide |
| | Delay | None |
| | | Action specified by Display bit executed after Call Duration Timer Delay |

Query Display Manager

The Query Display Manager command is sent by the NI to request various status information from the Display manager. The format of the command is as follows.

| Parameters: | Attributes | requests the Attributes Info command to be sent. |
|---|---|---|
| | TAD | requests the Time and Date Format command to be sent. |
| | Cursor | requests the Cursor Location command to be sent. |
| | Contrast | requests the Contrast Level command to be sent. |
| | Backlight | requests the Backlight Status Info command to be sent. |
| | Highlight | requests the Highlight Status command to be sent. |
| | Current Character Table | requests the Current Character Table Configuration Status command to be sent. |
| | Default Character Table | requests the Default Character Table Configuration Status command to be sent. |

Download Call Duration Timer Delay

The Download Call Duration Timer Delay command is used to specify the delay to be used by the Call Duration Timer command when the Delay option is selected in the Call Duration Timer command.

| Parameters: | Call Duration Timer Delay | specifies the delay duration of call duration timer. |
|---|---|---|

Disable Display Field

The Disable Display Field command is used to enable and disable fields of the LCD. When a field is disabled it becomes blank until it is re-enabled. However, if the NI writes data to a disabled field, the data will be stored in the IT and will become visible on the LCD once it is re-enabled. All fields that have their corresponding bit set will be disabled and all others with their bit cleared will be enabled.

| Parameters: | | |
|---|---|---|
| | Numeric | Enable/Disable Numeric Index Field in the Info Bar |
| | Context | Enable/Disable Context Field in the Info Bar |
| | Date | Enable/Disable Date Field |
| | Time | Enable/Disable Time Field |
| | Line X | Enable/Disable Line X |
| | Softkey Y | Enable/Disable Softkey Y |
| | All | Enable/Disable all fields |

Clear Field

This command is used to erase fields of the LCD. Many portion of the display can be cleared at the same time. Once a field is cleared, the data it contained is lost and cannot be re-displayed on the field unless re-downloaded by the IT.

| Parameters: | | |
|---|---|---|
| | Numeric | Clear Numeric Index Field in the Info Bar |
| | Context | Clear Context Field in the Info Bar |
| | Date | Clear Date Field |
| | Time | Clear Time Field |
| | Line X | Clear Line X |
| | Softkey Y | Clear Softkey Y |
| | All | Clear all fields |

Cursor Control

This command is used to activate, configure and move the cursor on the display.

| Parameters: | | |
|---|---|---|
| | Cursor Movement | Set cursor at home (first character on the first text line) |
| | | Set cursor at the specified position within the specified field |
| | | Move the cursor by one to the left |
| | | Move the cursor by one to the right |
| | | Move the cursor a specified number of positions to the left |
| | | Move the cursor a specified number of positions to the right |
| | Cursor State | ON |
| | | OFF |
| | | Blink |
| | Field | Numeric |
| | | Line |
| | | SoftKey |
| | Softkey ID | The Softkey ID when field specifies softkey |
| | Line Number | Line number when field specifies line. |
| | Character Position | Position of the cursor in the specified field (zero being the first position within the field) |
| | Position Delta | Specifies number of positions left or right to move cursor |

Page Download

This command downloads portions of next up or next down page in the IT. A portion can be any field that characterizes the display, i.e., line, softkey, etc.

| Parameters: | | |
|---|---|---|
| | Field | Softkey |
| | | Line |
| | Line Number | Specifies line number when Line field is specified |
| | Softkey ID | Specifies softkey when Softkey field is specified |
| | Character Position | Specifies starting character position when Line field is specified |
| | Display Data | Data to be written to specified field and position |

Display Scroll with Data

This command is used to download a new line of text and to scroll the others up or down. This command only affects the line fields of the display. This command cannot download more than one new line of text at the time.

| Parameters: | | |
|---|---|---|
| | Scroll Direction | Down: Place text data on first line and scroll others down |
| | | Up: Place text data on last line scroll others up |
| | Display Data | Data to be written |

Status Bar Icon Update

This command is used to change to current state and cadence of a status bar icon.

| Parameters: | | |
|---|---|---|
| | Status Bar Icon ID | specifies the status bar icon to be updated |
| | Icon State | specifies desired state of icon |
| | Icon Cadence | Off |
| | | On |
| | | Flash |
| | | Flicker |
| | | Wink |
| | | Twinkle |
| | | Blink |
| | | Downloadable cadence |

Month Labels Download

This command is used to download the label for the current and next months. These labels are used in the date field and enable the date to roll over to next month.

| Parameters: | | |
|---|---|---|
| | Current Month Label | Text string representing current month |
| | Next Month Label | Text string representing next month |

Call Duration Timer Label Download

This command is used to download the call duration timer label which will be displayed on the IT's display when the call duration timer is activated.

| Parameters: | | |
|---|---|---|
| | Call Duration Timer Label | Text string representing call duration timer label |

Time and Date Format

This command is used to specify the format that the Display manager will use to present the time and the date information to the user.

| Parameters: | Time Format | 12-hour clock (e.g. 10:34 pm) |
| | | French clock (e.g. 22 h 34) |
| | | 24-hour clock (e.g. 22:34) |
| | Date Format | day first (e.g. 16 Sep) |
| | | month first (e.g. Sep 16) |
| | | numeric standard (e.g. 09/16) |
| | | numeric inverse (e.g. 16/09) |

Notes:
1) For the day-first and for the month-first formats, the month label has to be downloaded, via the Month Label Download command.

Display Data Write

This command is used as a generic command for writing to the display. It is composed of four parts: the address, the control, the tag and the data. Three of these parts, the address, the control, and the tag, are optional. The display data part is mandatory. The address byte is used to specify where the text to write starts. If no address is specified, the data will start at the current cursor position. The tag field is used to give a meaning to the attached text (directory, CLID, etc.). The control field is used to control characteristics of the display. If the control field is not present, the default control setup will be used.

| Parameters: | Address | Field | Numeric |
| | | | Context |
| | | | Line |
| | | | SoftLabelKey |
| | | | Softkey |
| | | Line Number | Specifies line number when Line field is specified |
| | | SoftLabelKey ID | Specifies soft labelled key when Soft Labeled Key field is specified |
| | | Softkey ID | Specifies softkey when Softkey field is specified |
| | | Character Position | Specifies starting character position when Line field is specified |
| | Control | Cursor Movement | None |
| | | | Cursor moves to end of new text |
| | | Clear Left | Clears the text at the left of the active position before writing the new text. |
| | | Clear Right | Clears the text at the right of the active position before writing the new text. |
| | | Shift Left | Shifts text at the specified position to the left when writing new text. |
| | | Shift Right | Shifts text at the specified position to the right when writing new text. |
| | | Highlight | Highlights new text |
| | | Extended Height | Displays new text in extended height format |
| | Tag | Tag Data | Non displayed data indicating purpose of data |
| | Data | Display Data | Data to be displayed per command |

Context Info Bar Format

This command is used to specify the format of the Context Info bar field. The supported formats are the ones specified in the functional description of the IT in question.

| Parameters: | Format | none |
| | | Underline |
| | | Overline |
| | | Marquee |
| | | Border |
| | | Reverse-video |
| | | Reverse-video with border |
| | Field | Numeric |
| | | Context |
| | | Date |
| | | Time |

Set Default Character Table Configuration

This command downloads the default character map configuration that the display manager must use. It specifies the mapping of the character table to the graphics tables and it also specifies which one of the graphics table is to be lock-shifted (code A0 to FF hex).

| Parameters: | Default Character Table Configuration | Data representing Default character table configuration |

Set Current Character Table Configuration

This command downloads the current character map configuration that the display manager must use. It specifies the mapping of the character table to the graphics tables and it also specifies which one of the graphics table is to be lock-shifted (code A0 to FF hex).

| Parameters: | Default Character Table Configuration | Data representing Default character table configuration |

Special Character Download

This command is used to download special characters that are not specified in the character ROM tables of the IT. In the command, the special character address is specified as well as bitmap.

| Parameters: | Character ID | identifies character to be downloaded |
|---|---|---|
| | Bitmap Data | data defining the character |

Highlighted Field Definition

This command is used to highlight a portion of the display.

| Parameters: | Field | Numeric |
|---|---|---|
| | | Context |
| | | Line |
| | | SoftKey |
| | Line Number | Line number when field specifies line. |

-continued

| | Softkey ID | The Softkey ID when field specifies softkey |
|---|---|---|
| | Starting Position | Starting character position of the highlighted portion. |
| | Ending Position | Ending character position of the highlighted portion. |

Contrast

This command sets the contrast level.

| Parameters: | Contrast | Specifies contrast level to be set |
|---|---|---|

Caller Log Download

This command is used to update the time and date fields with a downloaded time and text label instead of the usual time and date information.

| Parameters: | Hour | Specifies hour |
|---|---|---|
| | Minutes | Specifies minutes |
| | Text Label | Text data to be written to the Date field |

IT to NI Display Commands
   Display Manager Attributes Info
   Contrast Level Report
   Cursor Location Report
   Highlight Status On
   Current Character Table Configuration Status
   Default Character Table Configuration Status
   Time and Date Format Report
   Status Bar Icon State Report
   Backlight Status
   Highlight Status Off Display Manager Attributes Info This command is used in response to the Query Display Manager (Attributes) command.

| Parameters: | Line Width | The width of the text area lines expressed in characters |
|---|---|---|
| | Lines | Number of lines in the text area |
| | Line Icon | When set, it indicates that an icon is associated with each line in the text area of the display |
| | Softkey Width | The width of the softkeys expressed in characters. |
| | Softkeys | Number of softkeys |
| | Soft Labeled Key Width | The width of the Soft-Labeled key area expressed in characters. |
| | Soft Labeled Keys | Number of soft labeled keys |
| | Context Field Width | The width of the context field expressed in characters. |
| | Numeric Width | Number of digit supported in the numeric index field. |
| | Time Width | Number of Character supported in the time field. |
| | Date Width | Number of Character supported in the date field. |
| | Character Download | Number of downloadable characters. |
| | Free Form Icon Download | Number of downloadable free form icons |
| | Character sets | List of supported character sets |

Contrast Level Report

This command is used in response to the Query Display Manager (Contrast) command. It gives the current display contrast level. The level is set by the NI with the Contrast command.

| Parameters: | Contrast Level | Current setting of display contrast |
|---|---|---|

Cursor Location Report

This command is used in response to the Query Display Manager (Cursor) command. It gives the position of the cursor on the display.

| Parameters: | Field | Numeric |
|---|---|---|
| | | Line |
| | | SoftKey |

-continued

| | | |
|---|---|---|
| | Softkey ID | The Softkey ID when field specifies softkey |
| | Line Number | Line number when field specifies line. |
| | Character Position | Position of the cursor in the specified field (zero being the first position within the field) |

Highlight Status On

This command is used in response to the Query Display Manager (Highlight) command when the highlight feature is on. The command defines the display area that is currently highlighted.

| | | |
|---|---|---|
| Parameters: | Field | Numeric |
| | | Context |
| | | Line |
| | | SoftKey |
| | Line Number | Line number when field specifies line. |
| | Softkey ID | The Softkey ID when field specifies softkey |
| | Starting Position | Starting character position of the highlighted portion. |
| | Ending Position | Ending character position of the highlighted portion. |

Current Character Table Configuration Status

The Current Character Table Configuration Status command is used in response to the Query Display Manager (Current Config) command. It informs the NI about the current character table configuration of the display manager.

| | | |
|---|---|---|
| Parameters: | Contrast Level | Current contrast setting |
| | Current Character Table Confuration | Data representing current character table configuration |

Default Character Table Configuration Status

The Default Character Table Configuration Status command is used in response to the Query Display Manager (Default Config) command. It informs the NI about the default character table configuration of the display manager.

| | | |
|---|---|---|
| Parameters: | Contrast Level | Current contrast setting |
| | Default Character Table Confuration | Data representing default character table configuration |

Time and Date Format Report

The Time and Date Format command is used in response to the Query Display Manager (TAD) command. It reports on the format that the IT uses to present the time and date information to the user.

| | | |
|---|---|---|
| Parameters: | Time Format | 12-hour clock (e.g. 10:34pm) |
| | | French clock (e.g. 22h34) |
| | | 24-hour clock (e.g. 22:34) |
| | Date Format | day first (e.g. 16Sep) |
| | | month first (e.g. Sep16) |
| | | numeric standard (e.g. 09/16) |
| | | numeric inverse (e.g. 16/09) |

Status Bar Icon State Report

This command is used in response to the Query Display Manager (Icon) command. It gives the current state and cadence of the selected status bar icon.

| | | |
|---|---|---|
| Parameters: | Status Bar Icon ID | specifies the status bar icon to be updated |
| | Icon State | specifies desired state of icon |
| | Icon Cadence | Off |
| | | On |
| | | Flash |
| | | Flicker |
| | | Wink |
| | | Twinkle |
| | | Blink |
| | | Downloadable cadence |

Backlight Status

This command is used in response to the Query Display Manager (Backlight) command. It gives the current state of the backlight. The backlight is controlled by the NI with the Display Backlight Control command.

| | | |
|---|---|---|
| Parameters: | Backlight Status | On |
| | | Off |

Highlight Status Off

This command is used to respond to the Query Display Manager (Highlight) command when the status of the highlight is off.

COMMAND SUMMARY

TABLE 1

Broadcast Manager Commands

| NI to IT | IT to NI |
|---|---|
| Logical Icon Update | |
| Time and Data Download | |
| Set Default Character Table Configuration | |

TABLE 2

Network Manager Commands

| NI to IT | IT to NI |
|---|---|
| Soft Reset | Soft Reset Ack |
| Hard Reset | Sanity OK |
| Query Network Manager | Network Manager Attributes info |
| Network Manager Options | Network Manager Diagnostic Info |
| Control Channel QoS Configuration | Manager Ids |
| Reserve UDP Port Block | Network Manager Options Report |
| Server Identification Tag | Resume Connection With Server |
| Set RTCP Source Description Items | Suspend Connection With Server |
| Protocol Switch | Reserved UDP Ports Report |
| Download Backup Server Information | Copyright Text |
| Server Switch | |
| Server Alarm | |

TABLE 3

Basic Manager Commands

| NI to IT | IT to NI |
|---|---|
| Start Selftest | Basic Manager Attributes Info |
| Query Basic Manager | Basic Manager Options Report |
| Basic Manager Options | F/W version |
| General Read/Write | IT Type |
| Eeprom Write | Selftest result |
| Encapsulate Command | General Read Response |
| | Hardware ID |
| | Product Engineering Code |

TABLE 4

Key/Indicator Manager Commands

| NI to IT | IT to NI |
|---|---|
| LED Update | Key Event |
| Query Hookswitch | LED Status Report |
| User Activity Timer | On hook |
| Downloadable Free Form Icon Access | Off hook |
| Query Key/Indicator Manager | User Activity Timer Expired |
| Key/Indicator Manager Options | Hookswitch State |
| Logical Icon Mapping | Key/Indicator Manager Attributes info |
| Key Repeat Timer Download | Key/Indicator Manager Options Report |
| Query LED State | IT Icon Status Report |
| Query IT Icon State | |
| Indicator Cadence Download | |
| User Activity Timer Download | |
| Free Form Icon Download | |
| IT Icon Update | |

TABLE 5

Audio Manager Commands

| NI to IT | IT to NI |
|---|---|
| Query Audio Manager | Handset connected |
| Query Supervisor Headset Status | Handset disconnected |
| Audio Manager Options | Headset connected |
| Mute/unmute | Headset disconnected |
| Transducer Based Tone On | Supervisor Headset connected |
| Transducer Based Tone Off | Supervisor Headset disconnected |
| Alerting Tone Configuration | Headset Feature Key Pressed |
| Special Tone Configuration | Audio Manager Attributes info |
| Paging Tone Configuration | Audio Manager Options Report |
| Alerting Tone Cadence Download | Adjustable Rx Volume Report |
| Special Tone Cadence Download | Adjustable Rx Volume Information |
| Paging Tone Cadence Download | APB's Default Rx Volume Value |
| Transducer Based Tone Volume Level | Alerting Tone Select |
| Alerting Tone Test | APB's Tx and/or STMR Response |
| Visual Transducer Based Tones Enable | RTCP Statistics Report |
| Stream Based Tone On | Open Audio Stream Report |
| Stream Based Tone Off | |
| Stream Based Tone Configuration | |
| Stream Based Tone Frequency Component List Download | |
| Stream Based Tone Cadence Download | |
| Select Adjustable Rx Volume | |
| Set APB's Rx Volume Levels | |
| Change Adjustable Rx Volume | |
| Adjust Default Rx Volume | |
| Adjust APB's Tx and/or STMR Volume Level | |
| Query APB's Tx and/or STMR Volume Level | |
| ABP Download | |

TABLE 5-continued

Audio Manager Commands

| NI to IT | IT to NI |
|---|---|
| Open Audio Stream | |
| Close Audio Stream | |
| Connect Transducer | |
| Frequency Response Specification | |
| Biquad Download | |
| Voice Switching Configuration | |
| Query RTCP Statistics | |
| Vocoder Configuration | |
| Jitter Buffer Configuration | |

TABLE 6

Display Manager Commands

| NI to IT | IT to NI |
|---|---|
| Page Scroll | Display Manager Attributes Info |
| Restore Default Character Table Configuration | Contrast Level Report |
| Display Backlight Control | Cursor Location Report |
| Arrow | Highlight Status On |
| Query Status Bar Icon | Current Character Table Configuration Status |
| Highlight On/Off | Default Character Table Configuration Status |
| Restore Time and Date | Time and Date Format Report |
| Clear Time and Date | Status Bar Icon State Report |
| Call Duration Timer | Backlight Status |
| Query Display Manager | Highlight Status Off |
| Download Call Duration Timer Delay | |
| Disable Display Field | |
| Clear Field | |
| Cursor Control | |
| Page Download | |
| Display Scroll with Data | |
| Status Bar Icon Update | |
| Month Label Download | |
| Call Timer Label Download | |
| Time and Date Format | |
| Display Data Write | |
| Context Info Bar Format | |
| Set Default Character Table Configuration | |
| Set Current Character Table Configuration | |
| Special Character Download | |
| Highlighted Field Definition | |
| Contrast | |
| Caller Log Download | |

What is claimed is:

1. An apparatus for facilitating provision of services in an IP data network for a data network telephone, the apparatus comprising:

a network intelligence for communicating IP messages to the data network telephone over the IP data network and facilitating provision of services for the data network telephone; and wherein the network intelligence comprises a first service proxy launched in response to a first input received at the data network telephone based upon information in a first configuration data structure associated with the data network telephone, the first service proxy operable for setting up a first data service between a first data source and the data network telephone, and wherein the first configuration data structure correlates user input elements from the data network telephone with functions.

2. The network intelligence of claim 1 wherein the network intelligence is provisioned with software for implementing a one of an H.323 protocol and a Session Initiation Protocol.

3. The network intelligence of claim 1 wherein the network intelligence is arranged for connection to a plurality of data network telephones of a first data network running under a first protocol and wherein the network intelligence is arranged for connection to a second network running under a second protocol.

4. The network intelligence of claim 3 wherein the first data network is an internet protocol network.

5. The network intelligence of claim 4 wherein the second network is a wireless network.

6. The network intelligence of claim 1 wherein the first service proxy is arranged for setting up a one of an audio streaming service.

7. The network intelligence of claim 1 wherein the first service proxy is arranged for setting up a directory number locating service.

8. The network intelligence of claim 1 wherein the first service proxy is arranged for setting up a map navigation service.

9. The network intelligence of claim 1 wherein the first service proxy is arranged for setting up a weather information service.

10. The network intelligence of claim 1 wherein the first service proxy is arranged for setting up a Short Messaging service.

11. The network intelligence of claim 1 wherein the first service proxy is arranged for setting up an event notification service.

12. The network intelligence of claim 1 wherein the first service proxy is arranged for setting up a speech recognition service.

13. The network intelligence of claim 1 wherein the first service proxy is arranged for providing an e-mail service.

14. The network intelligence of claim 1 wherein the first service proxy is provisioned with HTML capability.

15. The network intelligence of claim 1 wherein the network intelligence further comprises a second service proxy launched in response to a second input received at the data network telephone based upon information in a second configuration data structure associated with the data network telephone, the second service proxy operable for setting up a second service between a second data source and the data network telephone.

16. An apparatus for facilitating provision of services in an IP data network for a data network telephone, the apparatus comprising:
   a network intelligence for communicating IP messages to the data network telephone over the IP data network and facilitating provision of services for the data network telephone;
   wherein the network intelligence comprises a first service proxy launched in response to a first input received at the data network telephone based upon information in a first configuration data structure associated with the data network telephone, the first service proxy operable for setting up a first service between a first data source and the data network telephone; and
   a plurality of configuration data structures for each of a plurality of data network telephones, each configuration data structure for a given one of the plurality of telephones correlating user input elements of the given telephone with functions.

17. The network intelligence of claim 16 wherein the user input elements comprise key press indications.

18. A method for facilitating provision of services in an IP data network for a data network telephone, the method comprising:
   communicating IP messages to the data network telephone over the LP data network; and
   facilitating a first service between a first data source and the data network telephone, comprising launching a first service proxy in response to a first input received at the data network telephone based upon information in a first configuration data structure associated with the data network telephone, and wherein the first configuration data structure correlates user input elements from the data network telephone with functions.

* * * * *

UNITED STATES PATENT AND TRADEMARK OFFICE
CERTIFICATE OF CORRECTION

| | | |
|---|---|---|
| PATENT NO. | : 7,660,295 B2 | Page 1 of 1 |
| APPLICATION NO. | : 11/300997 | |
| DATED | : February 9, 2010 | |
| INVENTOR(S) | : Allan et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 945 days.

Signed and Sealed this

Thirtieth Day of November, 2010

David J. Kappos
*Director of the United States Patent and Trademark Office*